US012647908B2

(12) United States Patent
Xu et al.

(10) Patent No.:  US 12,647,908 B2
(45) Date of Patent:        Jun. 2, 2026

(54) TIMING CONTROL FOR INTER-USER EQUIPMENT MEASUREMENTS INVOLVED IN NON-TERRESTRIAL NETWORKS

(71) Applicant: QUALCOMM Incorporated, San Diego, CA (US)

(72) Inventors: Huilin Xu, Temecula, CA (US); Lianghai Ji, San Diego, CA (US); Weimin Duan, San Diego, CA (US); Liangping Ma, San Diego, CA (US); Qiang Wu, San Diego, CA (US); Jun Ma, San Diego, CA (US); Mohamad Sayed Hassan, Paris (FR); Mehmet Izzet Gurelli, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/659,166

(22) Filed: Apr. 13, 2022

(65) Prior Publication Data

US 2023/0337154 A1      Oct. 19, 2023

(51) Int. Cl.
  H04B 17/336          (2015.01)
  H04W 24/10          (2009.01)
        (Continued)

(52) U.S. Cl.
  CPC ........ H04W 56/001 (2013.01); H04B 17/336 (2015.01); H04W 24/10 (2013.01); H04W 84/06 (2013.01)

(58) Field of Classification Search
  None
  See application file for complete search history.

(56) References Cited

U.S. PATENT DOCUMENTS

2020/0228212 A1*  7/2020  Xu ...................... H04L 27/2602
2021/0006438 A1*  1/2021  Harrebek .............. H04W 24/10
        (Continued)

FOREIGN PATENT DOCUMENTS

WO        2020170218 A1    8/2020
WO    WO-2020192276 A1 * 10/2020  ........... H04B 17/345
        (Continued)

OTHER PUBLICATIONS

Huawei et al., "Discussion on Accuracy Requirements for CLI Measurements", 3GPP TSG-RAN WG4 Meeting #94-e, R4-2001621, 3rd Generation Partnership Project (3GPP), Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020, XP051851512, paragraph 2.3.
        (Continued)

*Primary Examiner* — Scott M Sciacca
(74) *Attorney, Agent, or Firm* — Procopio, Cory, Hargreaves & Savitch LLP

(57)        ABSTRACT

A first UE may obtain at least one parameter associated with an Rx timing of one or more CLI measurement resources. The one or more CLI measurement resources may be associated with CLI between the first UE and at least one second UE. The first UE may further refrain from receiving one or more serving DL channels or resources from a network node during the Rx timing based on the at least one parameter. The one or more serving DL channels or resources may overlap with at least one symbol of the one or more CLI measurement resources.

30 Claims, 18 Drawing Sheets

(51) Int. Cl.
  *H04W 56/00*     (2009.01)
  *H04W 84/06*     (2009.01)

(56)           References Cited

U.S. PATENT DOCUMENTS

| | | | | |
|---|---|---|---|---|
| 2021/0050983 A1* | 2/2021 | Manolakos | ........... | H04W 24/10 |
| 2022/0060265 A1 | 2/2022 | Xu et al. | | |
| 2022/0104061 A1* | 3/2022 | Abedini | ............ | H04W 28/0236 |
| 2022/0116129 A1* | 4/2022 | Ying | ................... | H04B 7/0617 |
| 2022/0124533 A1* | 4/2022 | Li | ......................... | H04W 24/10 |
| 2022/0191724 A1* | 6/2022 | Hwang | ................ | H04B 17/336 |
| 2023/0164701 A1* | 5/2023 | Fakoorian | ............. | H04L 5/0053 |
| | | | | 455/522 |
| 2023/0188231 A1* | 6/2023 | Chong | ................. | H04B 17/254 |
| | | | | 370/252 |

FOREIGN PATENT DOCUMENTS

| | | | |
|---|---|---|---|
| WO | 2021253435 A1 | 12/2021 | |
| WO | 2022021343 A1 | 2/2022 | |

OTHER PUBLICATIONS

International Search Report and Written Opinion—PCT/US2023/
015409—ISA/EPO—May 31, 2023.
NTT DOCOMO, Inc., "Summary on UE Features for CLI/RIM",
3GPP TSG RAN WG1 #100bis-e, R1-2002455, 3rd Generation
Partnership Project (3GPP), Mobile Competence Centre, 650, Route
Des Lucioles, F-06921, Sophia-Antipolis Cedex, France, vol. RAN
WG1, No. e-Meeting, Apr. 20, 2020-Apr. 30, 2020, Apr. 18, 2020,
XP051876655, 15 pages.

\* cited by examiner

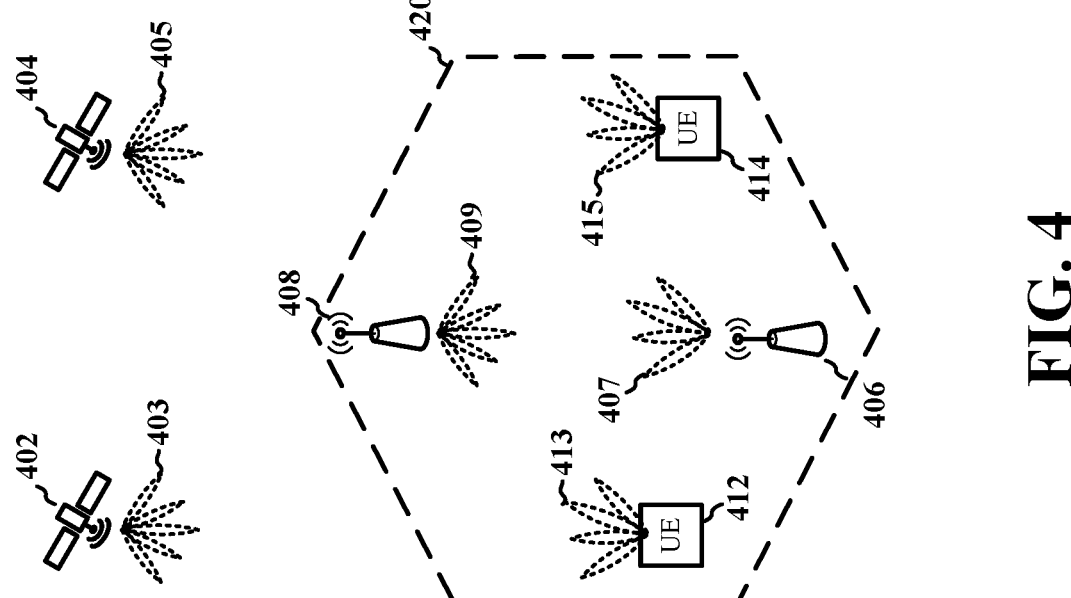
FIG. 4

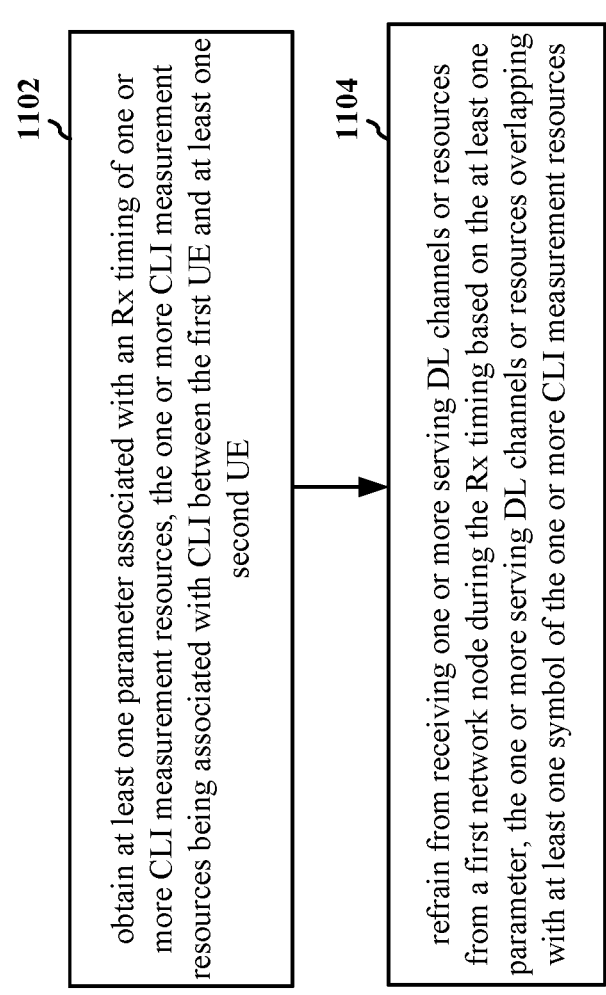

1102 obtain at least one parameter associated with an Rx timing of one or more CLI measurement resources, the one or more CLI measurement resources being associated with CLI between the first UE and at least one second UE

1104 refrain from receiving one or more serving DL channels or resources from a first network node during the Rx timing based on the at least one parameter, the one or more serving DL channels or resources overlapping with at least one symbol of the one or more CLI measurement resources

1202 transmit, to the first network node, a UE location associated with the Rx timing

1204 obtain at least one parameter associated with an Rx timing of one or more CLI measurement resources, the one or more CLI measurement resources being associated with CLI between the first UE and at least one second UE

1206 refrain from receiving one or more serving DL channels or resources from a first network node during the Rx timing based on the at least one parameter, the one or more serving DL channels or resources overlapping with at least one symbol of the one or more CLI measurement resources

1212 measure the one or more CLI measurement resources during the Rx timing of the one or more CLI measurement resources

1208 obtain the at least one parameter associated with the Rx timing by receiving the at least one parameter associated with the Rx timing from the first network node

1210 transmit, to a second network node that communicates with the at least one second UE, an inter-UE measurement result based on the at least one parameter associated with the Rx timing of the one or more CLI measurement resources—either (a) the first network node includes a first TN and the second network node includes a second NTN, (b) the first network node includes a first NTN and the second network node includes a second TN, or (c) the first network node includes the first NTN and the second network node includes the second NTN that is different from the first NTN

1402 configure at least one parameter associated with an Rx timing of one or more CLI measurement resources—the one or more CLI measurement resources being associated with CLI between at least one first UE configured to communicate with the first network node and at least one second UE configured to communicate with a second network node—either (a) the first network node includes a first TN and the second network node includes a second NTN, (b) the first network node includes a first NTN and the second network node includes a second TN, or (c) the first network node includes the first NTN and the second network node includes the second NTN that is different from the first NTN

1404 output the at least one parameter associated with the Rx timing of the one or more CLI measurements to the at least one first UE

1502 obtain a UE location from the at least one first UE, where the at least one parameter associated with the Rx timing is configured based on the UE location

1504 configure at least one parameter associated with an Rx timing of one or more CLI measurement resources—the one or more CLI measurement resources being associated with CLI between at least one first UE configured to communicate with the first network node and at least one second UE configured to communicate with a second network node

1506 output the at least one parameter associated with the Rx timing of the one or more CLI measurements to the at least one first UE

1508 refrain from transmitting one or more serving DL channels or resources to the at least one first UE during the Rx timing, where the one or more serving DL channels or resources overlap with at least one symbol of the one or more CLI measurement resources

1512 output an SRS resource to the at least one first UE, wherein the indication of the Rx timing is obtained from the at least one first UE via the SRS resource

1510 obtain an indication of the Rx timing from the at least one first UE, wherein the at least one parameter associated with the Rx timing is configured based on the indication of the Rx timing

1514 obtain the indication of the Rx timing from the at least one first UE by obtaining UAI including the indication of the Rx timing

FIG. 15

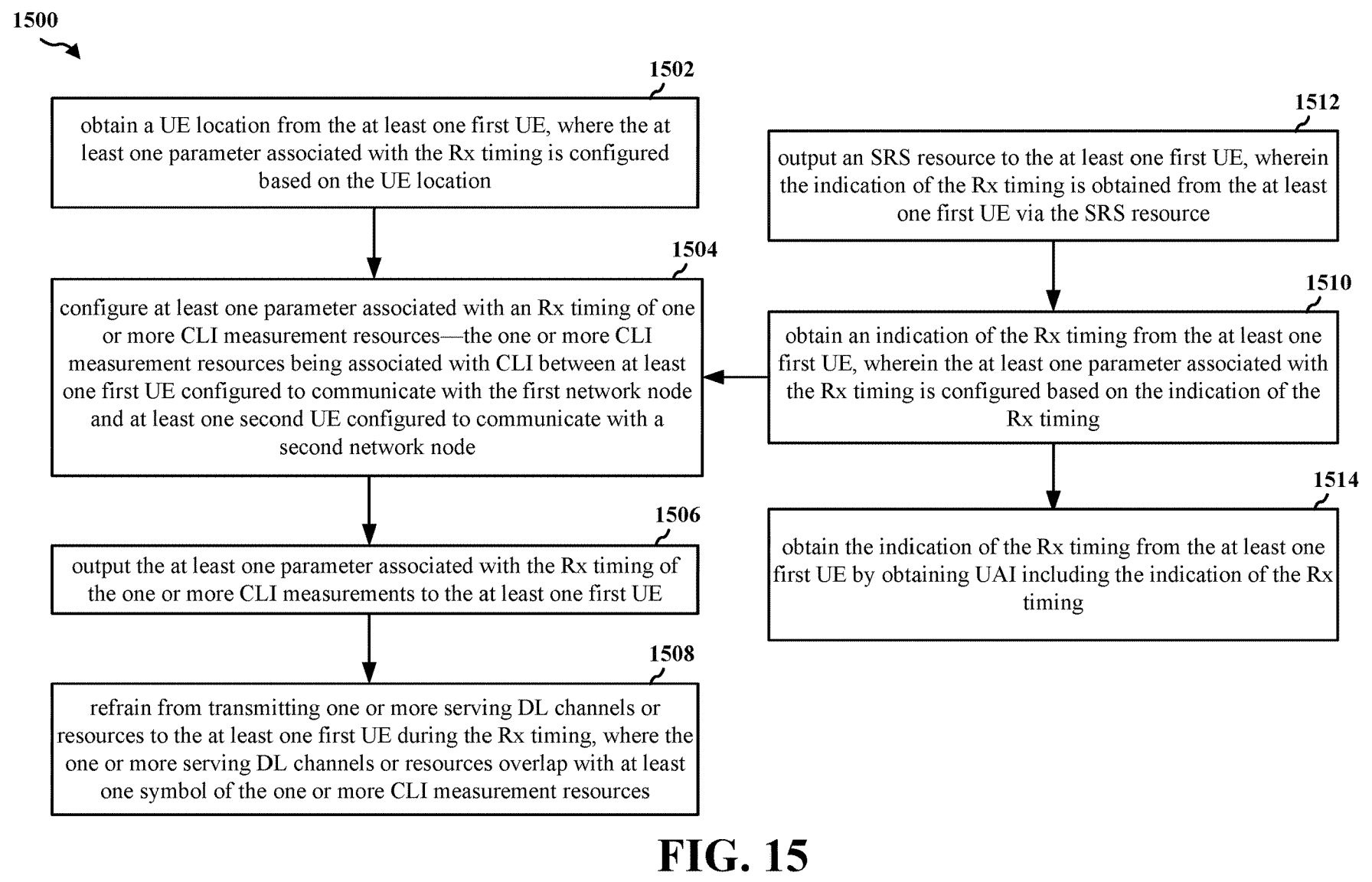

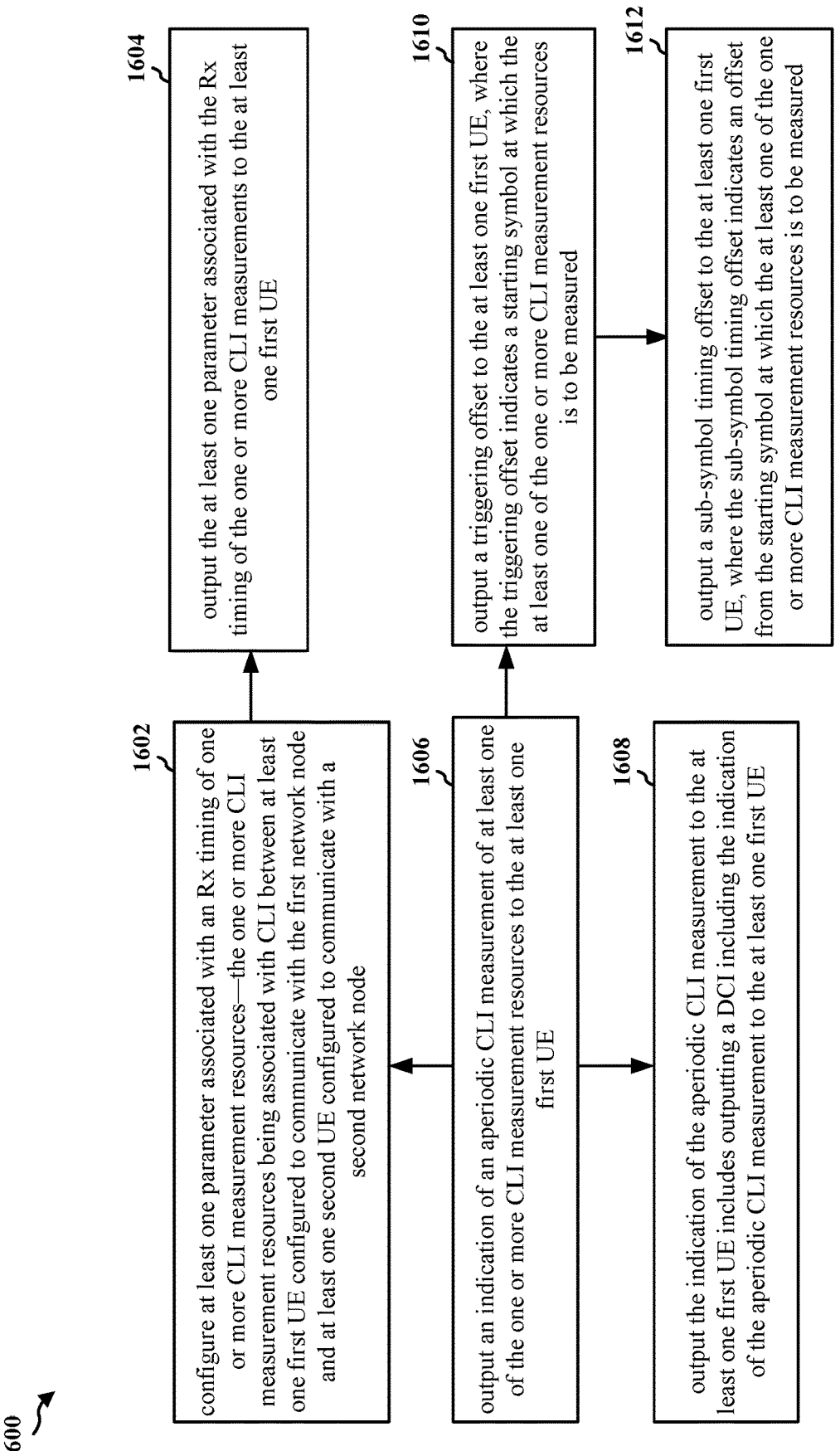

1602 — configure at least one parameter associated with an Rx timing of one or more CLI measurement resources—the one or more CLI measurement resources being associated with CLI between at least one first UE configured to communicate with the first network node and at least one second UE configured to communicate with a second network node 1604 — output the at least one parameter associated with the Rx timing of the one or more CLI measurements to the at least one first UE 1606 — output an indication of an aperiodic CLI measurement of at least one of the one or more CLI measurement resources to the at least one first UE 1608 — output the indication of the aperiodic CLI measurement to the at least one first UE includes outputting a DCI including the indication of the aperiodic CLI measurement to the at least one first UE 1610 — output a triggering offset to the at least one first UE, where the triggering offset indicates a starting symbol at which the at least one of the one or more CLI measurement resources is to be measured 1612 — output a sub-symbol timing offset to the at least one first UE, where the sub-symbol timing offset indicates an offset from the starting symbol at which the at least one of the one or more CLI measurement resources is to be measured

TIMING CONTROL FOR INTER-USER EQUIPMENT MEASUREMENTS INVOLVED IN NON-TERRESTRIAL NETWORKS

TECHNICAL FIELD

The present disclosure relates generally to communication systems, and more particularly, to a non-terrestrial network (NTN) communication system having cross-link interference (CLI) between user equipments (UEs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have first UE with a memory and at least one processor coupled to the memory. Based at least in part on information stored in the memory, the at least one processor may be configured to obtain at least one parameter associated with a receive (Rx) timing of one or more CLI measurement resources. The one or more CLI measurement resources may be associated with CLI between a first UE and at least one second UE. The at least one processor may be further configured to refrain from receiving one or more serving downlink (DL) channels or resources from a network node during the Rx timing based on the at least one parameter. The one or more serving DL channels or resources may overlap with at least one symbol of the one or more CLI measurement resources.

In another aspect of the disclosure, a method, a computer-readable medium, and an apparatus are provided. The apparatus may have a first network node with a memory and at least one processor coupled to the memory. Based at least in part on information stored in the memory, the at least one processor may be configured to configure at least one parameter associated with a receive (Rx) timing of one or more CLI measurement resources. The one or more CLI measurement resources may be associated with CLI between at least one first UE configured to communicate with the first network node and at least one second UE configured to communicate with a second network node. The first network node may include a first terrestrial network (TN) and the second network node may include a second non-terrestrial network (NTN). Alternatively, the first network node may include a first NTN and the second network node may include a second TN. Alternatively, the first network node may include a first NTN and the second network node may include a second NTN that is different from the first NTN.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating an example of a wireless communications system having user equipment configured to communicate with a TN network node and/or an NTN network node.

FIG. 11 is a flowchart of a method of wireless communication.

FIG. 12 is a flowchart of another method of wireless communication.

FIG. 14 is a flowchart of another method of wireless communication.

FIG. 15 is a flowchart of another method of wireless communication.

FIG. 16 is a flowchart of another method of wireless communication.

DETAILED DESCRIPTION

Figure 1:
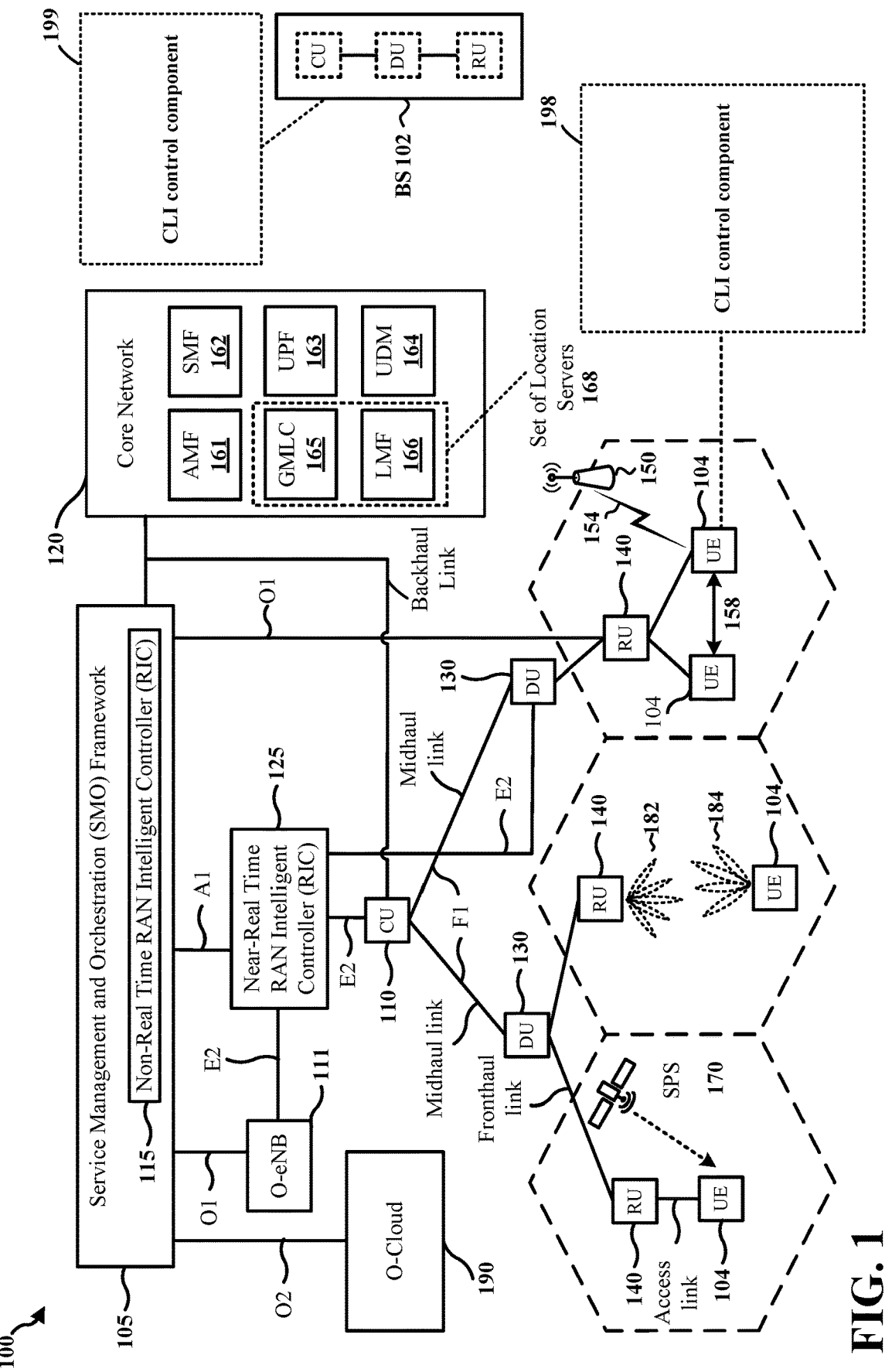
FIG. 1 is a diagram illustrating an example of a wireless communications system and an access network.

A downlink (DL) transmission from a first network node to a first user equipment (UE) may fail if a cross-link interference (CLI) measurement resource from a second UE to a second network node overlaps with DL channels or resources of the DL transmission. Network devices, such as user equipment (UE) and network nodes, may minimize or even prevent such overlap by using the offset timing between a DL transmission and the CLI measurement resource to schedule transmissions. However, the offset timing between a DL transmission and the CLI measurement resource can quickly change in non-terrestrial network (NTN) systems, since the location relationship between terrestrial UEs and NTNs are not stable.

Dynamic, rapid calculations of the offset timing between a DL transmission and the CLI measurement resource may be achieved in NTN systems by configuring a UE to analyze the receive (Rx) timing of CLI measurement resources and reporting relevant calculations to network nodes. A first UE may obtain at least one parameter associated with an Rx timing of one or more CLI measurement resources. The one or more CLI measurement resources may be associated with CLI between the first UE and at least one second UE. The first UE may further refrain from receiving one or more serving DL channels or resources from a network node during the Rx timing based on the at least one parameter. The one or more serving DL channels or resources may overlap with at least one symbol of the one or more CLI measurement resources.

A network node may configure at least one parameter associated with an Rx timing of one or more CLI measurement resources. The one or more CLI measurement resources may be associated with CLI between at least one first UE configured to communicate with the first network node and at least one second UE configured to communicate with a second network node. Either (a) the first network node includes a first TN and the second network node includes a second NTN, (b) the first network node includes a first NTN and the second network node includes a second TN, or (c) the first network node includes the first NTN and the second network node includes the second NTN that is different from the first NTN. The network node may further output the at least one parameter associated with the Rx timing of the one or more CLI measurement resources to the at least one first UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface)

connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component may be indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to obtain at least one parameter associated with an Rx timing of one or more CLI measurement resources and refrain from receiving one or more serving DL channels or resources from a network node during the Rx timing based on the at least one parameter using a CLI control component 198. In certain aspects, the base station 102 may be configured to configure at least one parameter associated with an Rx timing of one or more CLI measurement resources and output the at least one parameter associated with the Rx timing of the one or more CLI measurement resources to a UE using CLI control component 199. Although the following description may be focused on systems having NTN network nodes, the concepts described herein may be applicable to other similar areas, such as any systems having conflicting UL and DL symbols. Although the following description may be focused on 5G NR, the concepts described herein may be applicable to other similar areas, such as LTE, LTE-A, CDMA, GSM, and other wireless technologies.

Figures 2A, 2B, 2C, 2D:
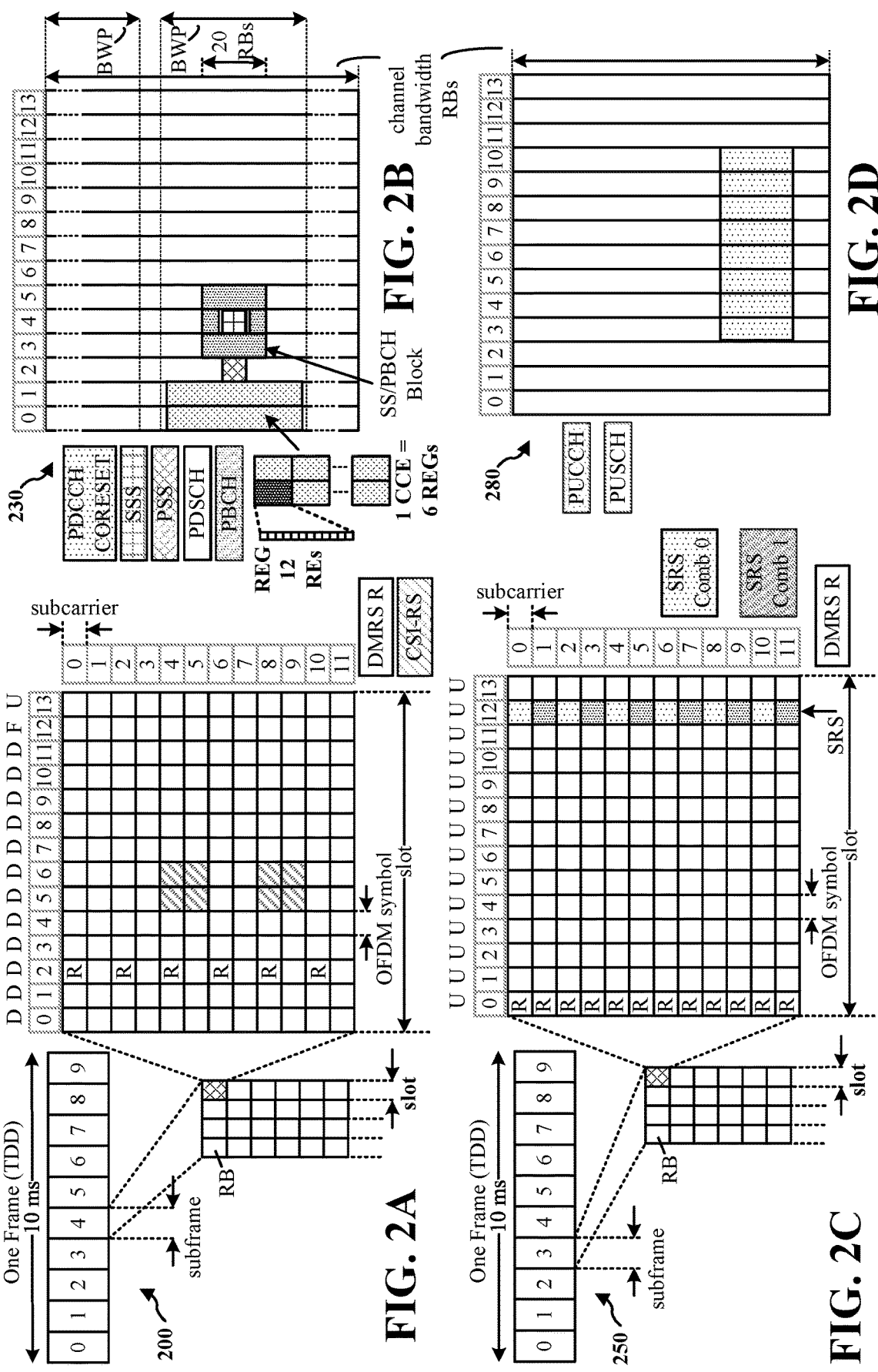
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
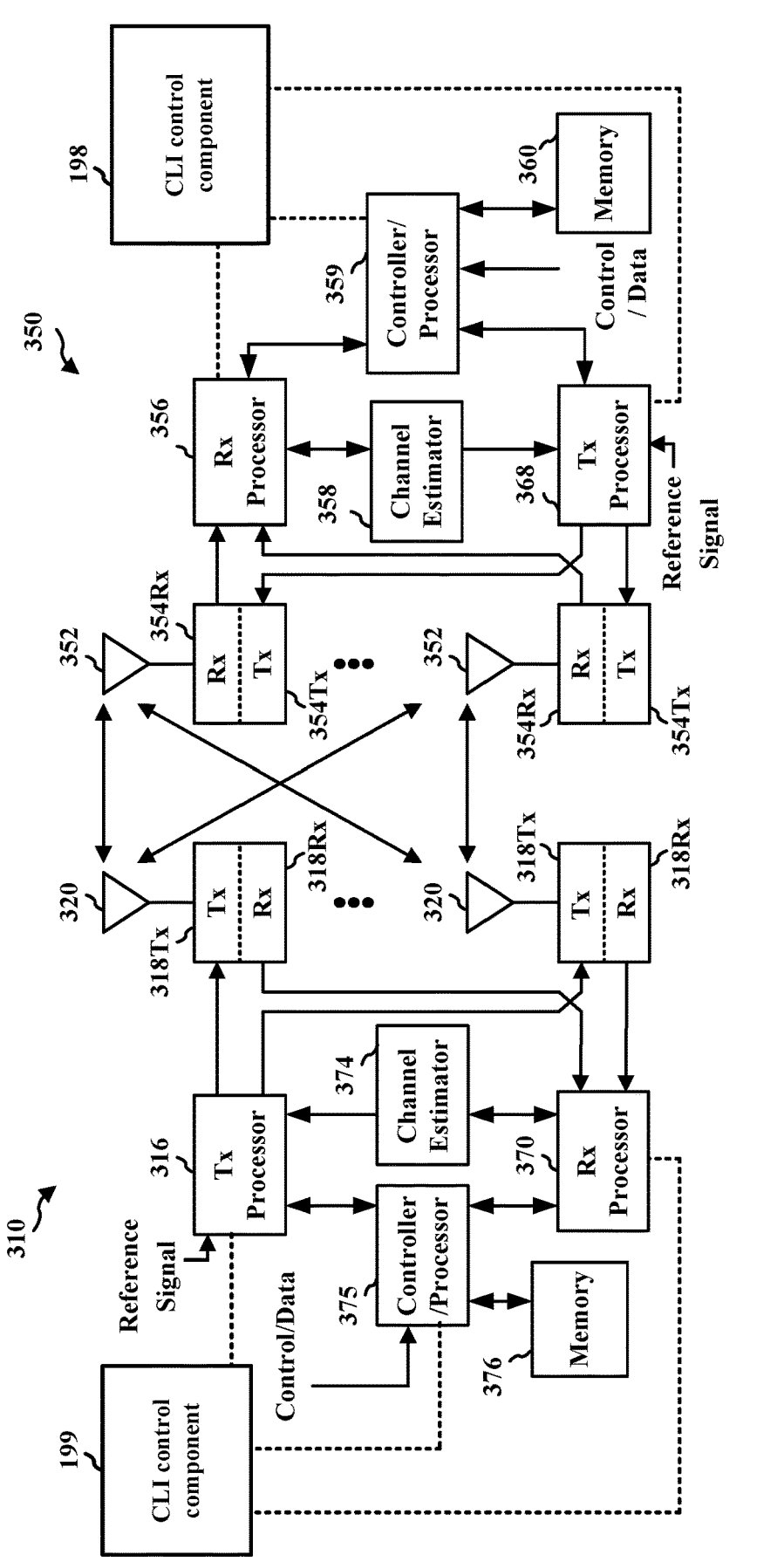
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CLI control component 198 of FIG. 1.

At least one of the Tx processor 316, the Rx processor 370, and the controller/processor 375 may be configured to perform aspects in connection with the CLI control component 199 of FIG. 1.

FIG. 4 is a diagram 400 of a wireless communications system having a first NTN network node 402, a second NTN network node 404, a first TN network node 406, a second TN network node 408, a first UE 412, and a second UE 414. A network node may include any of a CU, DU, RU, or a combination thereof, such as the base station 102 in FIG. 1. An NTN network node may have a satellite with a network node or a high-altitude platform, such as a drone, balloon, or airplane with a network node (i.e., operating as the network device). An NTN may be deployed in a frequency band (e.g., FR3) that is also used for a TN. For example, both a TN and an NTN network node may use Ku band TDD to communicate, such as IAB devices and common phase error (CPE) devices. In addition, the first NTN network node 402 and the second NTN network node 404 may share the same resources, and/or the first TN network node 406 and the second TN network node 408 may share the same resources. In other words, two or more of the signal 403, the signal 405, the signal 407, the signal 409, the signal 413, or the signal 415 may share the same resources, such as the same frequency band or sub-band.

The first UE 412 and the second UE 414 may share a logical cell 420 such that an Tx signal from the second UE 414 may interfere with an Rx signal received by the first UE 412. For example, where the first UE 412 is configured to communicate with the first TN network node 406 and the second UE 414 is configured to communicate with the second NTN network node 404, a Tx signal 415 from the second UE 414 may interfere with an Rx signal 407 to the first UE 412. In another example, where the first UE 412 is configured to communicate with the first NTN network node 402 and the second UE 414 is configured to communicate with the second TN network node 408, a Tx signal 415 from the second UE 414 may interfere with an Rx signal 403 to the first UE 412. In another example, where the first UE 412 is configured to communicate with the first NTN network node 402 and the second UE 414 is configured to communicate with the second NTN network node 404, a Tx signal 415 from the second UE 414 may interfere with an Rx signal 403 to the first UE 412. In another example, where the first UE 412 is configured to communicate with the first TN network node 406 and the second UE 414 is configured to communicate with the second TN network node 408, a Tx signal 415 from the second UE 414 may interfere with an Rx signal 407 to the first UE 412. In other words, CLI may emerge between two devices connected to two systems, such as a device connected to a TN and a device connected to an NTN, two devices connected to different NTNs, or two devices connected to different TNs.

CLI measurement timing between a first UE 412 configured to communicate with a first TN network node 406 and a second UE 414 configured to communicate with a second TN network node 408 may be handled using a constant measurement timing relative to the UE's serving cell DL timing, since the location relationship between the first UE 412 and the first TN network node 406 and the location relationship between the second UE 414 and the second TN network node 408 may be relatively stable. In other words, the constant offset may be a valid assumption for CLI measurement in TN due to the stable location relationship of the aggressor UE and the victim UE. However, where one of the UEs is configured to communicate with an NTN network node, or where both of the UEs are configured to communicate with two different NTN network nodes, a constant offset may not be a valid assumption. Due to the fast movement of an NTN network device on a satellite, drone, or airplane, the relative timing offset between the two devices may dynamically change over time at a rapid pace that is difficult to accommodate. In other words, for CLI measurement involved in NTN, a constant offset assumption may not be valid if the aggressor and victim UEs are connected to different network devices either in TN and NTN or to different NTNs.

Moreover, different network nodes, such as a TN network node and an NTN network node, or two different NTN network nodes, may have different conflicting UL and DL symbols. In one aspect, different semi-static TDD UL and DL slot formats may be configured to address different UL and DL throughput demands. In another aspect, dynamic TDD may be enabled on one or both network nodes to improve better balancing of UL and DL throughput. In another aspect, round trip time (RTT) slew rate may be different between one network node and another network node as a result of different mobility (e.g., an NTN network node may move faster relative to a TN network node, or one NTN network node may move faster relative to another NTN network node), which may lead to timing asynchronization between the two network nodes.

Figure 5:
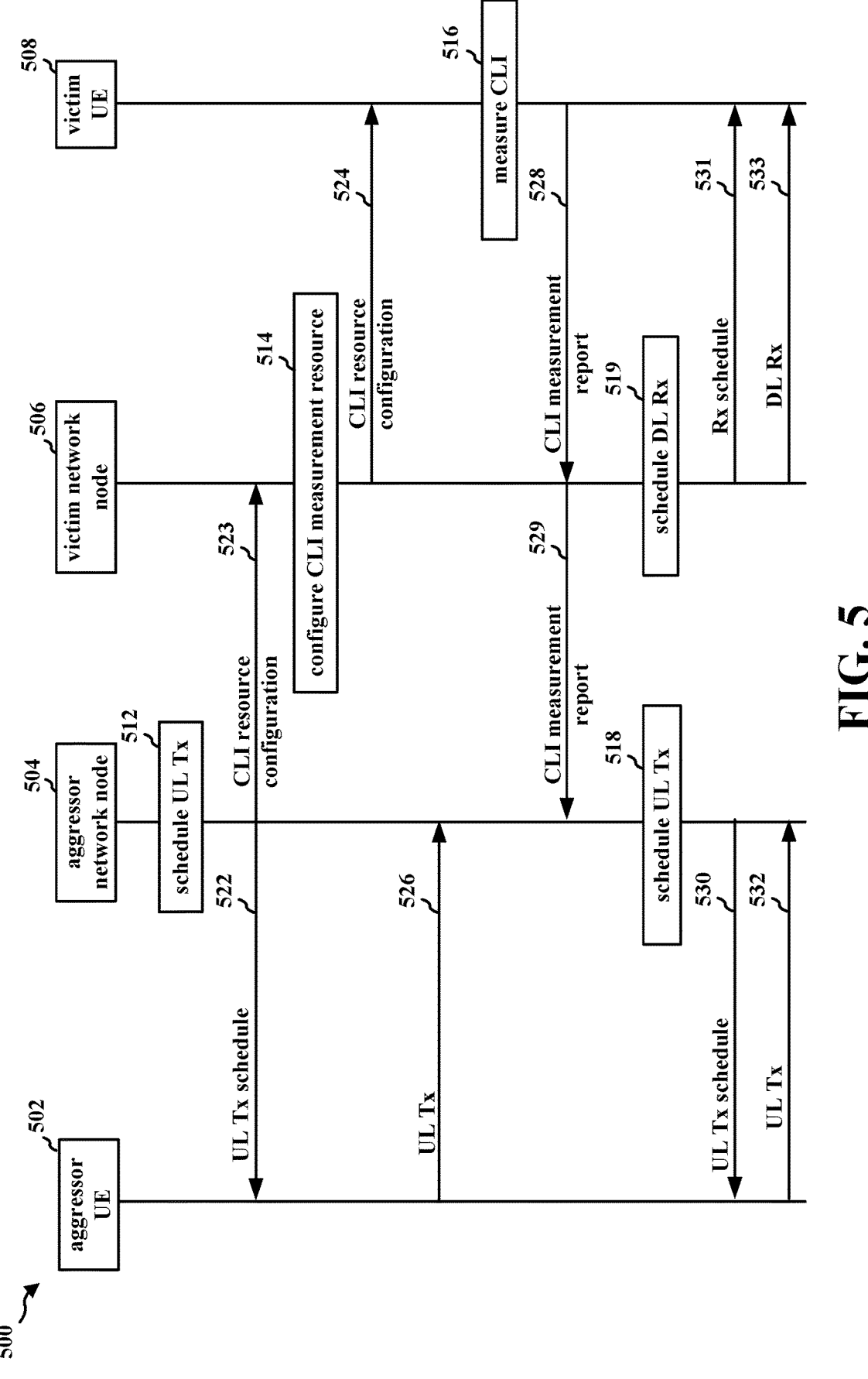
FIG. 5 is a network connection flow diagram that illustrates an aggressor network node and a victim network node configured to minimize CLI between an aggressor UE and a victim UE.

As stated above, a constant offset may be a valid assumption for CLI measurement in TN due to the stable location relationship of the aggressor UE and the victim UE. FIG. 5 is a network connection flow diagram 500 that illustrates an aggressor UE 502, an aggressor network node 504, a victim network node 506, and a victim UE 508. The aggressor network node 504 and the victim network node 506 may be TN network nodes that have a stable location relationship relative to the aggressor UE 502 and the victim UE 508, respectively. At 512, the aggressor network node 504 may schedule an UL Tx 526 for the aggressor UE 502, such as a UL transmission (e.g., PUSCH, PUCCH) from the aggressor UE 502 to the aggressor network node 504. The aggressor network node 504 may output the UL Tx schedule 522 to the aggressor UE 502, such as a DCI that schedules the UL Tx 526. The aggressor network node 504 may also output a CLI resource configuration 523 to the victim network node 506 to indicate the UL Tx 526 used by the aggressor UE 502.

At 514, the victim network node 506 may configure the CLI measurement resource (e.g., time and frequency locations and sequence) for the victim UE 508 that may correspond with the UL Tx 526. The measurement resource may correspond to the aggressor UE 502's UL Tx 526 to its serving base station, such as the aggressor network node 504. The victim network node 506 may output the CLI resource configuration 524 to the victim UE 508 to inform the victim UE 508 of the UL Tx 526, which may act as an RS CLI to the victim UE 508. At 516, the victim UE 508 may measure the CLI measurement resource corresponding to UL Tx 526, for example in terms of SRS, reference signal received power (RSRP), or received signal strength indicator (RSSI) with respect to the UL Tx 526. In one aspect, when the victim UE 508 measures SRS-RSRP and/or CLI-RSSI, the network may be configured to apply a constant offset relative to the downlink reference timing of the serving cell. The victim UE 508 may transmit a measurement report 528 as a result to the victim network node 506. The victim network node 506 may forward at least a portion of the measurement report 528 as a measurement report 529 to the aggressor network node 504.

At 518 the aggressor network node 504 may schedule the UL Tx 532 from the aggressor UE 502 and at 519 the victim network node 506 may schedule the DL Rx 533 to the victim UE 508 in accordance with the measurement report results. The network may take the CLI measurement report into account when it schedules the aggressor UE 502 and the victim UE 508. Depending upon the importance of the victim or aggressor UE's specifications, the network may avoid UL transmission from the aggressor UE 502 and assign the resource for the victim UE 508's DL reception, or may avoid DL scheduling for the victim UE 508 and may assign the resource for the aggressor UE 502's UL transmission, or may assign the resource to both the aggressor UE 502 and the victim UE 508 and allow CLI to exist in the CLI is at or below a threshold value. For example, in response to a network determining that the DL Rx 533 has a higher priority than the UL Tx 532, the victim network node 506 may output an Rx schedule 531 for the DL Rx 533 having an earlier time period and/or a more reliable frequency and the aggressor network node 504 may output a Tx schedule 530 for the UL Tx 532 having a later time period and/or a less reliable frequency. In another aspect, in response to a network determining that the UL Tx 532 has a higher priority than the DL Rx 533, the aggressor network node 504 may output a Tx schedule 530 for the UL Tx 532 having an earlier time period and/or a more reliable frequency and the victim network node 506 may output an Rx schedule 531 for the DL Rx 533 having a later time period and/or a less reliable frequency. In another aspect, in response to a network determining that the CLI impact of the UL Tx 526 is at or below a threshold value, the aggressor network node 504 may output a Tx schedule 530 for the UL Tx 532 having overlapping resources with the DL Rx 533 and the victim network node 506 may output an Rx schedule 531 for the DL Rx 533 having overlapping resources with the UL Tx 532.

Figure 6:
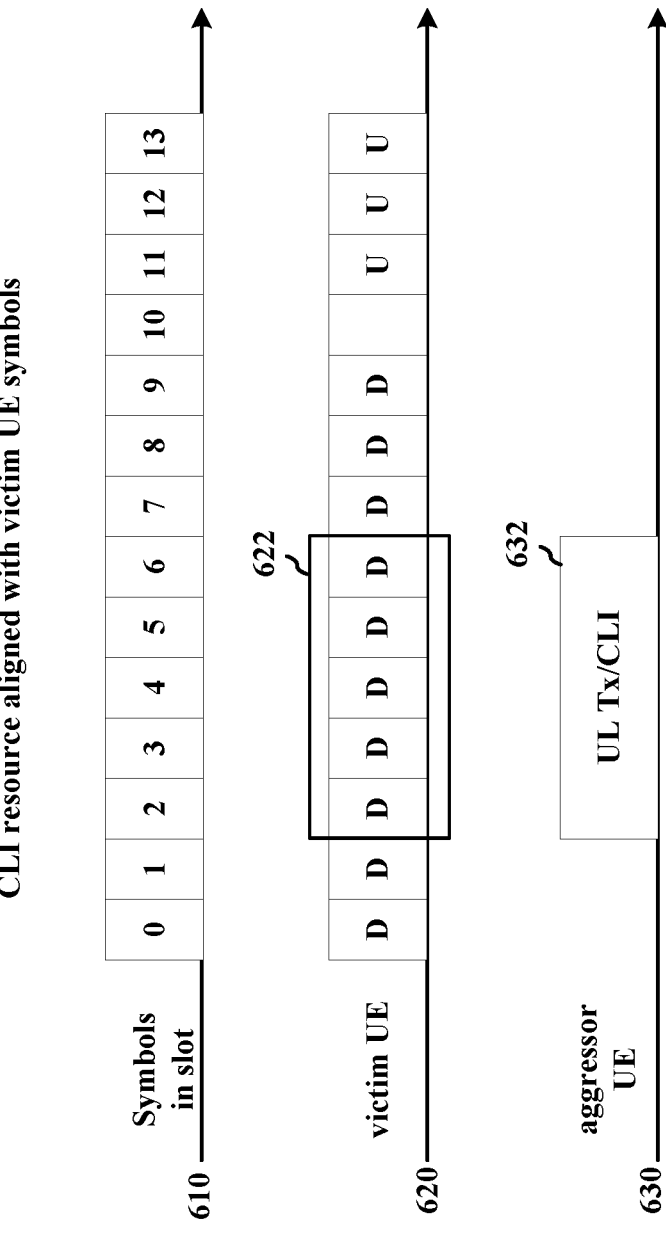
FIG. 6 is a diagram illustrating an example of a CLI resource aligned with victim UE symbols.

A CLI resource may or may not be aligned with the symbols or slots of a victim UE's serving cell DL. FIG. 6 is a diagram 600 illustrating an example of a UL Tx/CLI 632 of an aggressor UE 630 aligned with symbols 610 of a victim UE 620 having a set of scheduled resources. The victim UE 620 is scheduled to receive data from symbols 0 to 9, be idle during symbol 10, and upload data from symbols 11 to 13. However, the UL Tx/CLI 632 from aggressor UE 630 is scheduled from symbols 2 to 6. In response to the UL Tx/CLI 632 of the aggressor UE 630 interfering with the symbols 622 from symbols 2 to 6 of the victim UE 620, a network that configures the UL Tx/CLI 632 may be configured not to schedule any DL channels or resources (e.g., PDSCH, PDCCH, CSI-RS) during symbols 2 to 6 for the victim UE 620. In other words, the network may be configured to prioritize CLI over a serving cell DL. Similarly, in response to the UL Tx/CLI 632 of the aggressor UE 630 interfering with the symbols 622 from symbols 2 to 6 of the victim UE 620, the victim UE 620 may be configured not to receive a DL channel or resources during symbols 2 to 6 for the victim UE 620.

A timing offset between an aggressor UE's CLI and a victim UE's serving cell DL may be constant. For example, the CLI from the aggressor UE 630 may be constantly offset from the symbols of the victim UE 620 by two symbols, such that any CLI measurement resources corresponding to UL transmissions from the aggressor UE 630 scheduled during a slot may have a constant timing offset of two symbols. However, the difference between CLI timing and UE serving cell DL timing may not be constant, particularly in systems with one or more NTN network nodes, such as the system shown in diagram 400 in FIG. 4 having a first NTN network node 402 and a second NTN network node 404. The difference between the timing offset at CLI and the next CLI may be greater than several slots.

Figure 7:
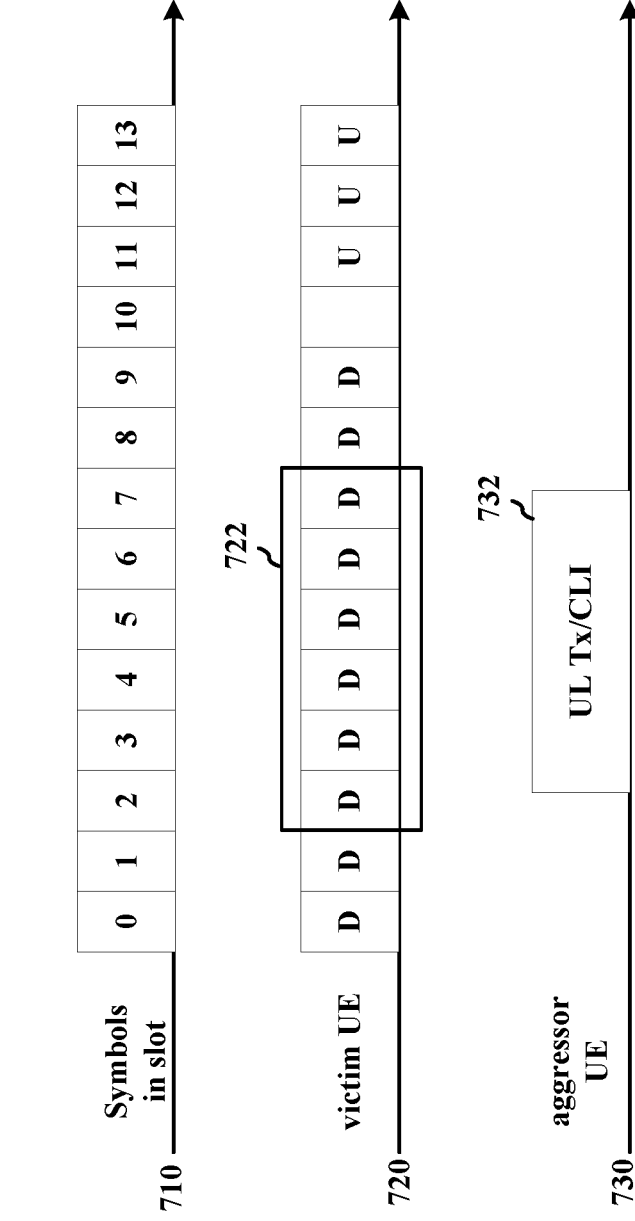
FIG. 7 is a diagram illustrating an example of a CLI resource not aligned with victim UE symbols.

Moreover, a CLI resource may not be aligned with the symbols or slots of a victim UE's serving cell DL. FIG. 7 is a diagram 700 illustrating an example of a UL Tx/CLI 732 of an aggressor UE 730 that is not aligned with symbols 710 of a victim UE 720 having a set of scheduled resources.

Similar to the victim UE 620 in FIG. 6, the victim UE 720 in FIG. 7 is scheduled to receive data from symbols 0 to 9, be idle during symbol 10, and upload data from symbols 11 to 13. However, the UL Tx/CLI 732 corresponding to UL transmissions from aggressor UE 730 is scheduled from part of symbol 2 to part of symbol 7 of victim UE 720's symbols 710. While the UL Tx/CLI 732 may be five symbols long, the UL Tx/CLI 732 may interfere with six symbols 722 of the victim UE 720 from symbol 2 to symbol 7, as the beginning of UL Tx/CLI 732 may partially overlap with symbol 2 of victim UE 720's symbols 710 and the end of UL Tx/CLI 732 may partially overlap with symbol 7 of victim UE 720's symbols 710. In response to the UL Tx/CLI 732 of the aggressor UE 730 interfering with any symbols 722 from symbols 2 to 7 of the victim UE 720, a network that configures the UL Tx/CLI 732 may be configured not to schedule any DL channels or resources (e.g., PDSCH, PDCCH, CSI-RS) during symbols 2 to 7 for the victim UE 720. In other words, the network may be configured to prioritize CLI over a serving cell DL. Similarly, in response to the UL Tx/CLI 732 corresponding to UL transmissions of the aggressor UE 730 interfering with the symbols 722 from symbols 2 to 7 of the victim UE 720, the victim UE 720 may be configured not to receive a DL channel or resources during symbols 2 to 7 for the victim UE 720.

Figure 8:
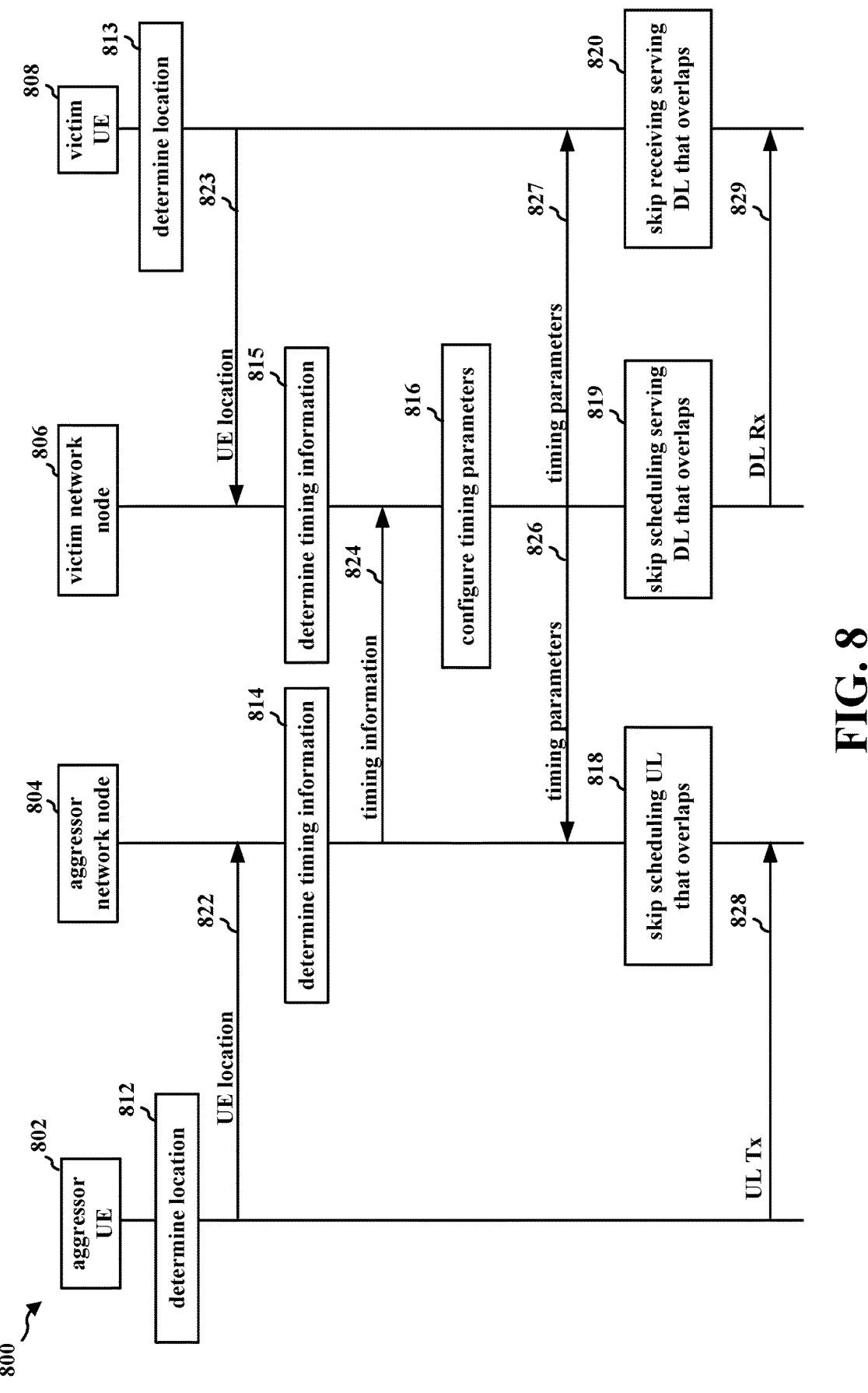
FIG. 8 is a network connection flow diagram that illustrates a victim network node configured to determine CLI timing parameters based on timing information received from an aggressor network node.

A network node, a UE, or both may be configured to calculate and transmit timing parameters to one another to improve the ability to calculate dynamically changing timing offsets for CLI measurement resources. FIG. 8 shows a network connection flow diagram 800 that illustrates a victim network node 806 configured to determine CLI timing parameters based on timing information received from an aggressor network node 804. The network connection flow diagram 800 has an aggressor UE 802, an aggressor network node 804, a victim network node 806, and a victim UE 808. The aggressor UE 802 and the victim UE 808 may share the same logical cell, such as the logical cell 420 in FIG. 4, such that a transmit signal from the aggressor UE 802 may interfere with a receive signal to the victim UE 808. At least one of the aggressor network node 804 and the victim network node 806 may have an NTN TRP or transceiver such that the measurement timing of a CLI measurement resource from the aggressor UE 802 is dynamic relative to the serving cell DL timing of the victim UE 808. The aggressor network node 804 and the victim network node 806 may be functionally connected to one another via a fronthaul, midhaul, or a backhaul link to allow data transfer of parameters.

To determine the timing of a CLI measurement resource corresponding to UL transmissions from the aggressor UE 802 relative to the serving cell DL timing of the victim UE 808, the aggressor UE 802 may be configured to report its location to the network. Based on the report, the network may derive the timing offset between the CLI measurement resource and the UE's serving cell DL timing. At 812 the aggressor UE 802 may be configured to determine its location, for example via a GNSS update, and transmit a UE location 822 to the aggressor network node 804. At 814, the aggressor network node 804 may determine timing information using the obtained location of the aggressor UE 802, and may output the timing information 824 to the victim network node 806.

In some aspects, at 813 the victim UE 808 may be configured to determine its location, for example via a GNSS update, and may be configured to transmit its UE location 823 to the victim network node 806. At 815, the victim network node 806 may determine timing information using the UE location 823 of the victim UE 808 to estimate the location of the aggressor UE 802 instead of having the timing information derived by the aggressor network node 804.

The timing information may include any information suitable for the victim network node 806 to determine the serving cell DL timing of the victim UE 808 relative to the serving cell DL timing of the aggressor UE 802. For example, the timing information may include the system timing of the aggressor network node 804 or a difference between the system timing of the victim network node 806 and the system timing of the aggressor network node 804. The timing information may include a timing delay between the aggressor UE 802 and the aggressor network node 804. The timing information may include an estimated distance between the aggressor UE 802 and a transceiver or a TRP of the aggressor network node 804. The timing information 824 may include a location of the aggressor network node 804 or information that may be used to determine a location of the aggressor network node 804 (e.g., ephemeris information).

At 816, the victim network node 806 may be configured to determine one or more timing parameters based on the timing information 824. For example, a timing parameter may include a system timing difference between the victim network node 806 and the aggressor network node 804. A timing parameter may include a timing delay between the aggressor UE 802 and the aggressor UE's base station. In one aspect, the victim network node 806 may be configured to use a location of the aggressor network node 804 to determine the timing delay between the aggressor UE 802 and the aggressor network node 804 by estimating that the location of the aggressor UE 802 is the same as the location of the victim UE 808. A timing parameter may include a timing delay between the victim UE 808 and the victim network node 806. Such a timing delay may be determined based on a location of the victim UE 808 or an estimated distance between the victim UE 808 and a transceiver or a TRP of the victim network node 806. While the timing parameters may also include a propagation delay between the victim UE 808 and the aggressor UE 802, such a distance may be ignored in some aspects. The timing parameters may also include an initial offset (e.g., offset between a CLI measurement resource corresponding to UL transmissions of the aggressor UE 802 and the victim UE 808 at a previous time), a slew rate for linear modeling of the variation over time, a formula configured to model higher order variation of the initial timing offset, or a set of variables of a formula configured to model higher order variation of the initial timing offset. Such variables may be used by any entity with such a formula to calculate the current timing offset between the serving cell DL timing of the victim UE 808 and the serving cell UL timing of the aggressor UE 802. Since these timing parameters may not share the same dynamics, the timing offset between a CLI measurement resource corresponding to UL transmissions of the aggressor UE 802 and the victim UE 808's serving cell DL timing may be time varying.

Such parameters may be used to determine the varying timing offset between the CLI measurement resource corresponding to UL transmissions of aggressor UE 802's and the victim UE 808's serving cell DL timing. The victim network node 806 may be configured to output one or more of the timing parameters as the timing parameters 826 to the aggressor network node 804 as timing parameters 826 and/or to the victim UE 808 as timing parameters 827. Based on the derived timing offset, the victim network node 806, the aggressor network node 804, or the victim UE 808 may reduce CLI. For example, at 819 the victim network node 806 may skip scheduling serving DL (e.g., PDCCH, PDSCH, CSI-RS) that overlaps with symbols of the UL Tx 828. In other words, the victim network node 806 may schedule the DL Rx 829 to not use the same channels or resources as the UL Tx 828 (i.e., a CLI measurement resource) of the aggressor UE 802. In another aspect, at 820 the victim UE 808 may skip receiving serving DL (e.g., PDCCH, PDSCH, CSI-RS, SPS PDSCH, periodic CSI-RS, SPS SCI-RS) that overlap with the UL Tx 828 corresponding to UL transmissions of the aggressor UE 802 (i.e., a CLI measurement resource of the aggressor UE 802). In other words, the victim UE 808 may refrain from receiving any portion of the DL Rx 829 that uses the same channels or resources that overlap with the UL Tx 828 corresponding to UL transmissions of the aggressor UE 802. In another aspect, at 818 the aggressor network node 804 may be configured to skip scheduling an UL transmission for the aggressor UE 802 that uses the same channels or resources that overlap with the DL Rx 829 of the victim UE 808.

Figure 9:
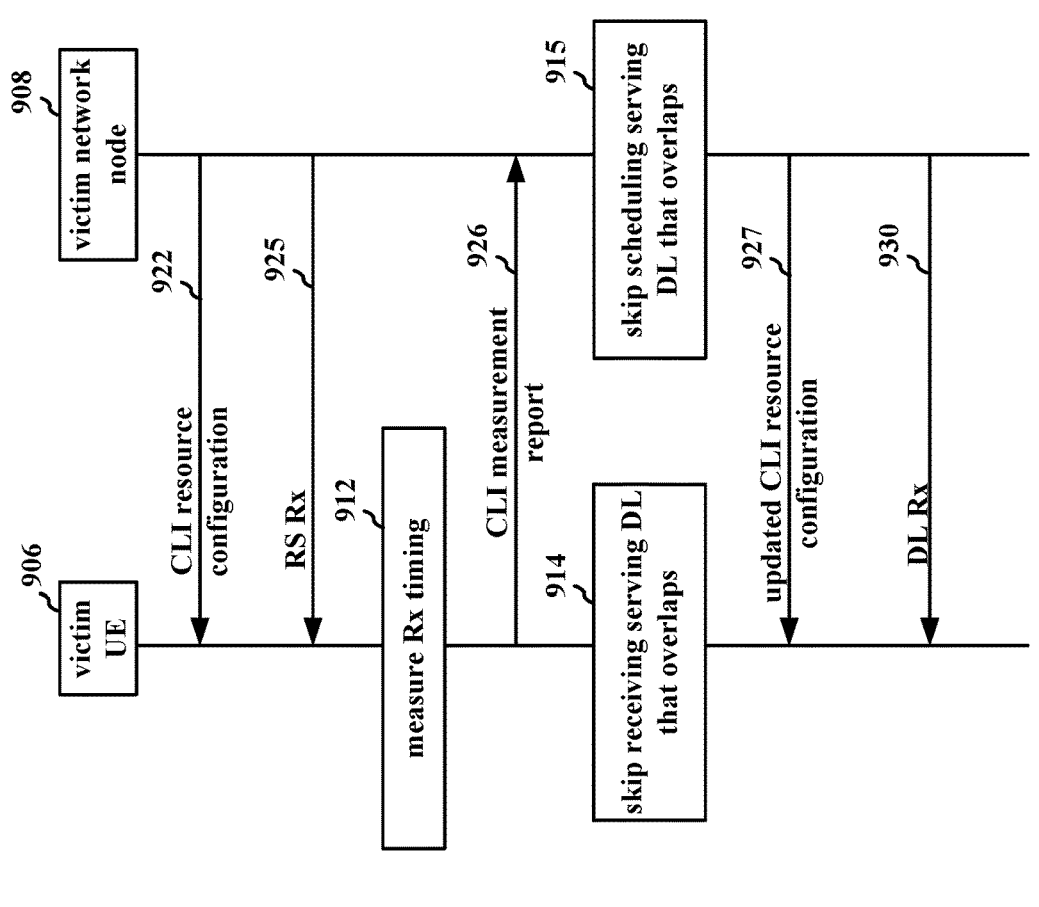
FIG. 9 is a network connection flow diagram that illustrates a victim UE configured to provide a CLI timing report to a victim network node based on measured Rx timing of a CLI resource.

In another aspect, a network may be configured to request a victim UE to measure a timing offset of a CLI measurement resource. FIG. 9 is a network connection flow diagram 900 that illustrates a victim UE 906 configured to provide a CLI timing report to a victim network node 908 based on measured Rx timing of a CLI measurement resource corresponding to UL Tx 924 of the aggressor UE. The network connection flow diagram 900 has an aggressor UE 902, an aggressor network node 904, a victim UE 906 and a victim network node 908. The aggressor UE 902 and the victim UE 906 may share the same logical cell, such as the logical cell 420 in FIG. 4, such that a transmit signal from the aggressor UE 902 may interfere with a receive signal to the victim UE 906. At least one of the aggressor network node 904 and the victim network node 908 may have an NTN TRP or transceiver such that the measurement timing of a CLI measurement resource from the aggressor UE 902 is dynamic relative to the serving cell DL timing of the victim UE 906. The aggressor network node 904 and the victim network node 908 may not be functionally connected to one another via a fronthaul, midhaul, or a backhaul link, which may prevent the aggressor network node 904 and the victim network node 908 from providing timing parameters, such as the timing parameters 826 in FIG. 8, to one another.

The aggressor network node 904 may be configured to schedule transmissions of UL channel or reference signal from the aggressor UE 902 to the aggressor network node 904 that may interfere with Rx transmissions of the victim UE 906. The aggressor network node may output a UL Tx schedule 923 to the aggressor UE 902 (e.g., a DCI) that schedules the UL Tx 924, and may output a UL Tx schedule 928 that schedules the UL Tx 929. In response to determining that one or more Rx transmissions to the victim UE 906 are not successfully received (e.g., the victim network node 908 obtains a NACK from the victim UE 906), the victim network node 908 may be configured to transmit a CLI resource configuration 922 to the victim UE 906. Such a configuration may be, for example, a DCI that triggers a periodic or aperiodic CLI measurement resource. A periodic CLI measurement resource may occur at layer 3 while an aperiodic CLI measurement resource may occur at layer 1. A DCI that triggers an aperiodic CLI measurement may indicate the starting symbol where the victim UE 906 should measure the UL Tx 924, for example by providing an offset or by referring to an RRC having a list of offsets. For example, the UL Tx/CLI 632 in FIG. 6 may have an offset of two symbols to indicate that the UL Tx/CLI 632 starts at symbol 2 of the symbols 610 and not at symbol 0. Such a DCI may also provide a sub-symbol timing offset, or the sub-symbol timing offset may be provided in a separate signal, such as a MAC control element (MAC-CE). For example, the UL Tx/CLI 732 in FIG. 7 may have an offset of 8 microseconds to indicate that the UL Tx/CLI 732 starts 8 microseconds into symbol 2 of the symbols 710. In some aspects, no sub-symbol timing is provided in either the DCI or a separate signal, and the victim UE 906 may be configured to derive the sub-symbol timing at 912 by searching the symbol offset provided by the DCI. In other aspects, no sub-symbol timing is provided in either the DCI or a separate signal, and the victim UE 906 may be configured to use the symbol timing of the DCI as a rough estimate of the timing of the CLI measurement resource corresponding to UL Tx 924 of aggressor UE. The DCI may also provide an SRS resource to the victim UE 906 to provide a CLI measurement report 926 (i.e., a CLI timing report). In another aspect, the configuration may be an RRC that provides a periodic SRS resource for the UE to provide a CLI measurement report 926. The victim network node 908 may also be configured to output an RS Rx 925 to the victim UE 906 which the victim UE 906 may use as a reference against the UL Tx 924 from the aggressor UE 902. The CLI resource configuration 922 may also include a timing reference, such as a previous timing offset.

At 912 the victim UE 906 may measure the Rx timing of the CLI measurement resource corresponding to UL Tx 924. The victim UE 906 may be configured to measure a timing of the CLI measurement resource corresponding to UL Tx 924 (e.g., when the CLI starts and stops) and compare it to the symbol slot timing of a reference signal, such as the RS Rx 925 obtained from the victim network node 908. The victim UE 906 may also be configured to measure an interference level of the RS Rx 925 as a threshold metric. In another aspect, the victim UE 906 may be configured to calculate the timing of the CLI measurement resource corresponding to UL Tx 924 by estimating the location of the aggressor UE 902 as the same as the location of the victim UE 906, and by determining a location of a TRP or a transceiver of the aggressor network node 904 using ephemeris information of the aggressor network node 904. In other words, the victim UE 906 may calculate the timing of the CLI measurement resource corresponding to UL Tx 924 by calculating the aggressor UE 902's channel delay to the aggressor network node 904 by estimating the location of the aggressor UE 902 and the location of a TRP or a transceiver of the aggressor network node 904, and by calculating the victim UE 906's channel delay to the victim network node 908, and a respective timing reference. A respective timing reference may include a timing reference of the aggressor network node 904 serving the aggressor UE 902, which may be different than a timing reference of the victim network node 908 serving the victim UE 906. The victim network node 908 may take the difference between the respective timing references into account to determine the Rx timing of the DL Rx 930 as compared to the UL Tx 929 (i.e., the CLI measurement resource).

The victim UE 906 may transmit a CLI measurement report 926 to the victim network node 908 containing at least a portion of the measurement results, such as a timing offset between the serving cell DL timing of the victim UE 906 and the CLI measurement resource corresponding to UL Tx 924 timing. The timing report may include an initial offset, a slew rate for linear modeling of the variation over time, a formula configured to model higher order variation of the initial timing offset, or a set of variables of a formula configured to model higher order variation of the initial timing offset. The report may be included in a UE assistance information (UAI) of the victim UE 906. The victim network node 908 may configure a formula configured to model higher order variation of the initial timing offset and the victim UE 906 may be configured to provide coefficient values of the formula to the victim network node 908.

Based on the timing report, the victim UE 906 or the victim network node 908 may reduce CLI. For example, at 914, the victim UE 906 may skip receiving serving DL that overlap with the CLI measurement resource corresponding to UL Tx 929 of the aggressor UE 902. In other words, the victim UE 906 may refrain from receiving any portion of the DL Rx 930 that uses the same channels or resources that overlap with the CLI measurement resource corresponding to UL Tx 929 of the aggressor UE 902. In another aspect, at 915, the victim network node 908 may skip scheduling serving DL that overlaps with symbols of the CLI measurement resource corresponding to UL Tx 929. In other words, the victim network node 908 may schedule the DL Rx 930 to not use the same channels or resources as the CLI measurement resource corresponding to UL Tx 929 of the aggressor UE 902. The victim network node 908 may identify symbols where the CLI measurement resource corresponding to UL Tx 929 may overlap with a possible DL Rx 930 and avoid scheduling DL channels or resources for the victim UE 906.

The victim network node 908 may be configured to confirm receipt of the CLI measurement report 926 by providing an updated CLI resource configuration 927 to the victim UE 906. The updated CLI resource configuration 927 may include a schedule for the DL Rx 930 that does not overlap the resources of the CLI measurement resource corresponding to UL Tx 929, and/or may include an RSSI measurement resource for the victim UE 906 to use with the CLI measurement resource corresponding to UL Tx 929.

Figure 10:
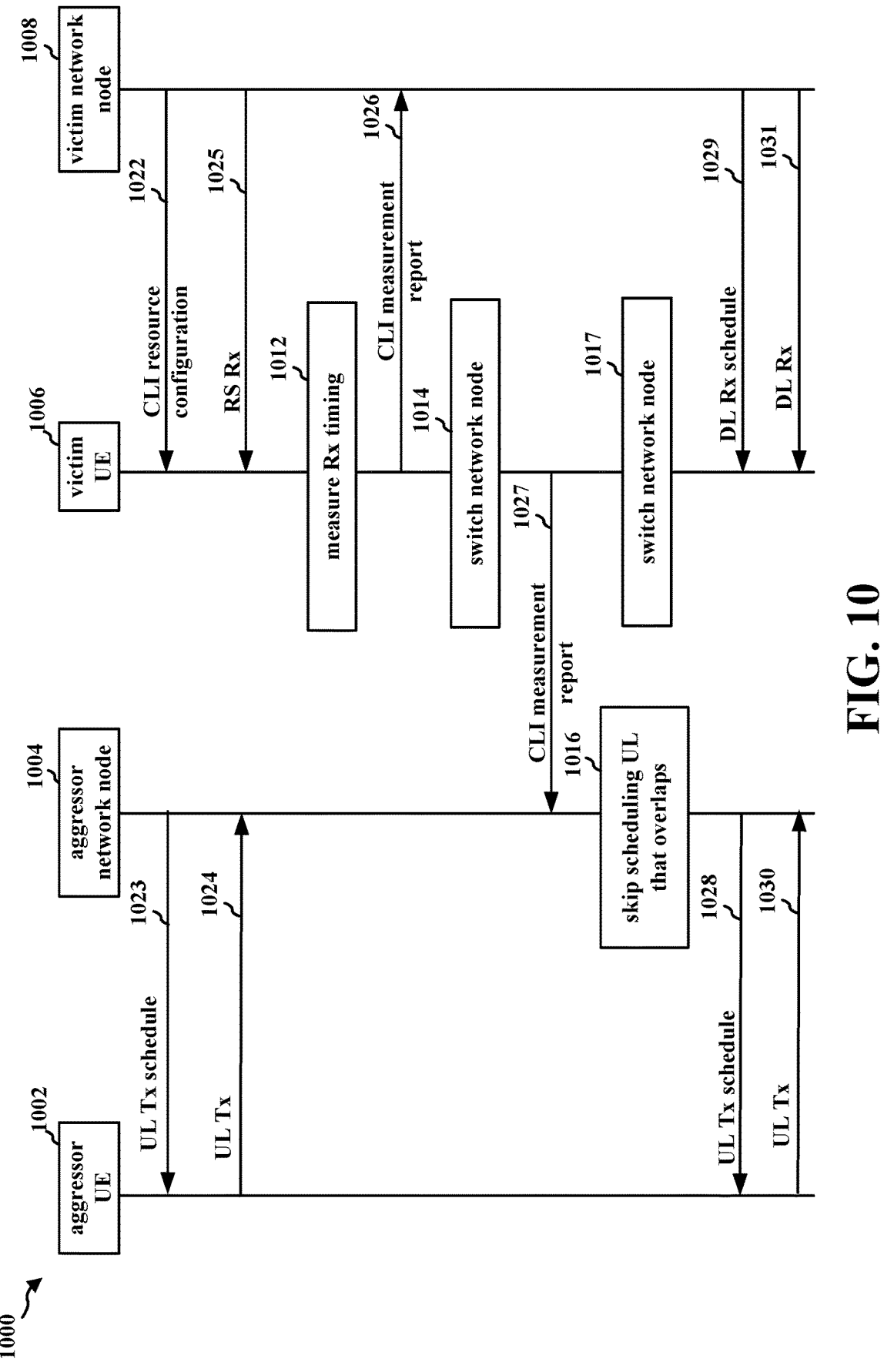
FIG. 10 is a network connection flow diagram that illustrates a victim UE configured to provide a CLI timing report to an aggressor network node based on measured Rx timing of a CLI resource.

In some aspects, the aggressor network node and the victim network node may not be configured to communicate with one another using a fronthaul, midhaul, or backhaul connection. For example, FIG. 10 shows a network connection flow diagram 1000 that illustrates a victim UE 1006 configured to provide a CLI measurement report 1027 (e.g., a CLI timing report) to an aggressor network node 1004 based on measured Rx timing of a UL Tx 1024. The network connection flow diagram 1000 has an aggressor UE 1002, an aggressor network node 1004, a victim UE 1006 and a victim network node 1008 similar to the aggressor UE 902, aggressor network node 904, victim UE 906, and victim network node 908 in FIG. 9.

Similar to the network connection flow diagram 900 in FIG. 9, the aggressor network node 1004 may be configured to schedule transmissions of CLI measurement resources from the aggressor UE 1002 to the aggressor network node 1004 that may interfere with Rx transmissions of the victim UE 1006. The aggressor network node may output a UL Tx schedule 1023 to the aggressor UE 1002 that schedules the UL Tx 1024, and may output a UL Tx schedule 1028 that schedules the UL Tx 1030. Similarly, the victim network node 1008 may be configured to transmit a CLI resource configuration 1022 to the victim UE 1006. The victim network node 1008 may also be configured to output an RS Rx 1025 to the victim UE 1006 which the victim UE 1006 may use as a reference against the UL Tx 1024 from the aggressor UE 1002.

At 1012 the victim UE 1006 may similarly measure the Rx timing of the UL Tx 1024 and may transmit a CLI measurement report 1026 to the victim network node 1008 containing at least a portion of the measurement results. Different from the victim UE 906 in FIG. 9, at 1014, the victim UE 1006 may be configured to switch its network node to communicate with the aggressor network node 1004. In other words, the victim UE 1006 may be configured to support communicating with both the aggressor network node 1004 and the victim network node 1008. Where one network node is a TN and the other network node is an NTN, the victim UE 1006 may be configured to support both an NTN and a TN. Where one network node is an NTN and the other network node is a different NTN, the victim UE 106 may be configured to support more than one NTN. The victim UE 1006 may be configured to report inter-UE measurement results when it switches to communicate with the aggressor network node 1004.

For example, where the victim network node 1008 is an NTN and the aggressor network node 1004 is a TN, the victim UE 1006 may operate in NTN mode, measure the interference from the aggressor UE 1002 at 1012, switch to TN mode to communicate with the aggressor network node 1004, and transmit the CLI measurement report 1027 to the aggressor network node 1004. Such a configuration may report an interference measurement result from an NTN network system to a TN serving base station. In another aspect, where the victim network node 1008 is a TN and the aggressor network node 1004 is an NTN, the victim UE 1006 may operate in TN mode, measure the interference from the aggressor UE 1002 at 1012, switch to NTN mode to communicate with the aggressor network node 1004, and transmit the CLI measurement report 1027 to the aggressor network node 1004. Such a configuration may report an interference measurement result from a TN network system to an NTN serving base station. In another aspect, where the victim network node 1008 is configured to communicate using an NTN 1 network and the aggressor network node 1004 is configured to communicate using an NTN 2 network different from NTN 1, the victim UE 1006 may operate in NTN 1 mode, measure the interference from the aggressor UE 1002 at 1012, switch to NTN 2 mode to communicate with the aggressor network node 1004, and transmit the CLI measurement report 1027 to the aggressor network node 1004. Such a configuration may report an interference measurement result from an NTN 1 network system to an NTN 2 serving base station. At 1017, the victim UE 1006 may be configured to switch the network node back to the victim network node 1008.

Based on the timing report, the aggressor network node 1004 may reduce CLI. For example, at 1016, the aggressor network node 1004 may be configured to skip scheduling an UL transmission for the aggressor UE 1002 that uses the same channels or resources that overlap with the DL Rx 1031 of the victim UE 1006. The aggressor network node 1004 may then output a UL Tx schedule 1028 (e.g., a modified CLI schedule) for the UL Tx 1030 that does not use the same channels or resources that overlap with the DL Rx 1031 of the victim UE 1006, and the victim network node 1008 may output a DL Rx schedule 1029 to the victim UE 1006 to schedule receipt of the DL Rx 1031 that may not have been successfully received by the victim UE 1006 if not for the UL Tx schedule 1028.

FIG. 11 is a flowchart 1100 of a method of wireless communication. The method may be performed by a UE (e.g., the UE 104, UE 350, UE 412, UE 414, UE 808, UE 906, or UE 1006; the apparatus 1704). At 1102, a first UE may obtain at least one parameter associated with an Rx timing of one or more CLI measurement resources. The one or more CLI measurement resources may be associated with CLI between the first UE and at least one second UE. For example, 1102 may be performed by the victim UE 808 in FIG. 8, which may obtain timing parameters 827 associated with an Rx timing of the UL Tx 828. The UL Tx 828 is associated with CLI between the victim UE 808 and the aggressor UE 802. Moreover, 1102 may be performed by component 198 in FIG. 17.

At 1104, the first UE may refrain from receiving one or more serving DL channels or resources from a first network node during the Rx timing based on the at least one parameter. The one or more serving DL channels or resources may overlap with at least one symbol of the one or more CLI measurement resources. For example, 1104 may be performed by the victim UE 808 in FIG. 8 that refrains from receiving the DL Rx 829 from the victim network node 806 during the Rx timing of the UL Tx 828 (i.e., a CLI measurement resource) based on the timing parameters 827. The DL Rx 829 may overlap with at least one symbol of the UL Tx 828, such as the symbols 2 to 6 of symbols 610 in FIG. 6 of the victim UE 620 at symbols 622 and the aggressor UE at UL Tx/CLI 632. Moreover, 1104 may be performed by component 198 in FIG. 17.

Figure 12:
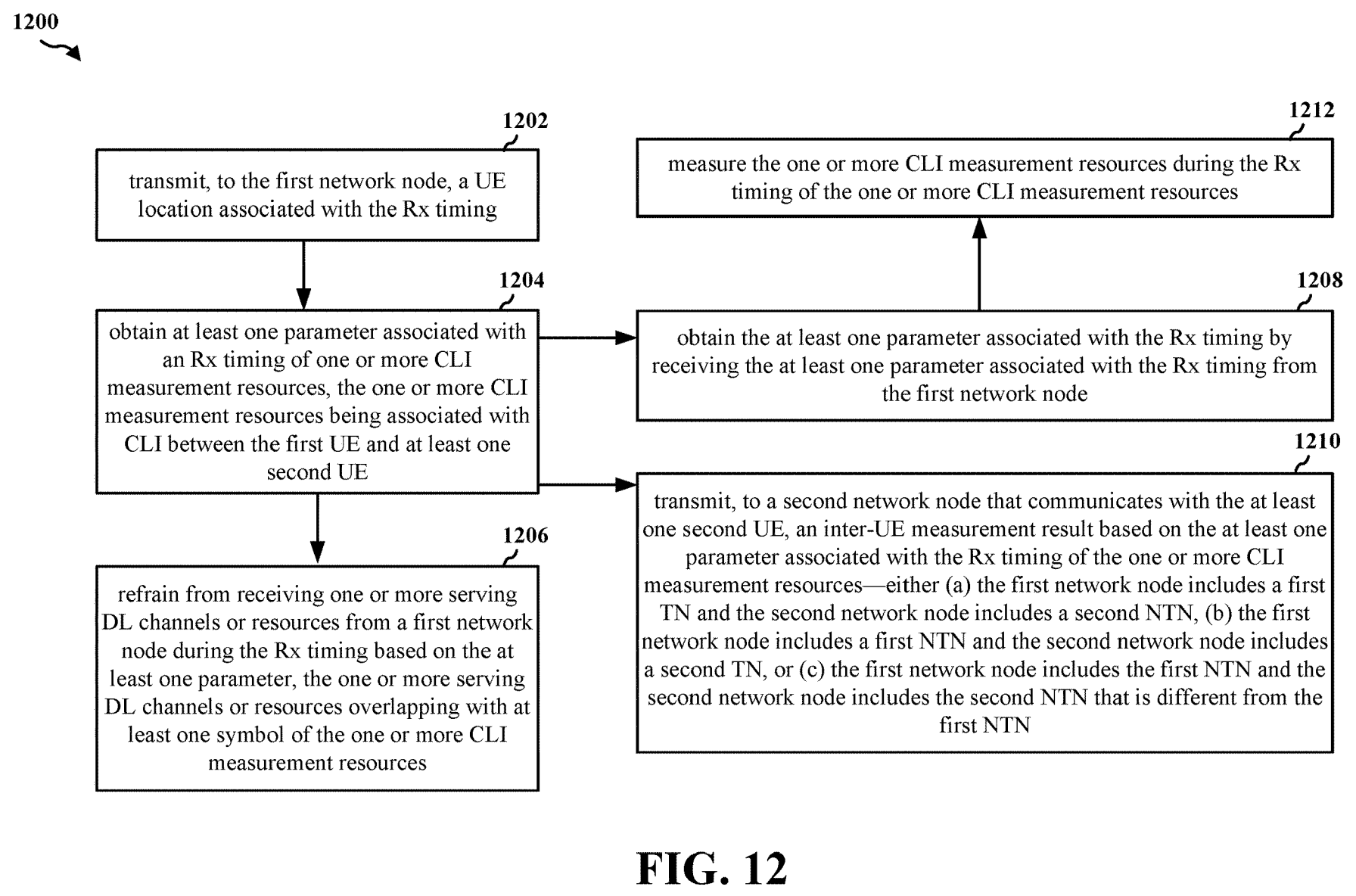

FIG. 12 is a flowchart 1200 of a method of wireless communication. The method may be performed by a UE (e.g., the UE 104, UE 350, UE 412, UE 414, UE 808, UE 906, or UE 1006; the apparatus 1704). At 1202, a first UE may transmit, to the first network node, a UE location associated with the Rx timing. For example, the victim UE 808 in FIG. 8 may be configured to transmit, to the victim network node 806, a UE location that estimates the location of the aggressor UE 802 that transmits the UL Tx 828. Moreover, 1202 may be performed by component 198 in FIG. 17.

At 1204, a first UE may obtain at least one parameter associated with an Rx timing of one or more CLI measurement resources. The one or more CLI measurement resources may be associated with CLI between the first UE and at least one second UE. For example, 1204 may be performed by the victim UE 808 in FIG. 8, which may obtain timing parameters 827 associated with an Rx timing of the UL Tx 828. The UL Tx 828 is associated with CLI between the victim UE 808 and the aggressor UE 802. Moreover, 1204 may be performed by component 198 in FIG. 17.

At 1206, the first UE may refrain from receiving one or more serving DL channels or resources from a first network node during the Rx timing based on the at least one parameter. The one or more serving DL channels or resources may overlap with at least one symbol of the one or more CLI measurement resources. For example, 1206 may be performed by the victim UE 808 in FIG. 8 that refrains from receiving the DL Rx 829 from the victim network node 806 during the Rx timing of the UL Tx 828 based on the timing parameters 827. The DL Rx 829 may overlap with at least one symbol of the UL Tx 828, such as the symbols 2 to 6 of symbols 610 in FIG. 6 of the victim UE 620 at symbols 622 and the aggressor UE at UL Tx/CLI 632. Moreover, 1206 may be performed by component 198 in FIG. 17.

At 1208, a first UE may obtain the at least one parameter associated with the Rx timing by receiving the at least one parameter associated with the Rx timing from the first network node. For example, the victim UE 808 in FIG. 8 may obtain the timing parameters 827 associated with the UL Tx 828 from the victim network node 806. Moreover, 1208 may be performed by component 198 in FIG. 17.

At 1210, a first UE may transmit, to a second network node that communicates with the at least one second UE, an inter-UE measurement result based on the at least one parameter associated with the Rx timing of the one or more CLI measurement resources. Moreover, either (a) the first network node includes a first TN and the second network node includes a second NTN, (b) the first network node includes a first NTN and the second network node includes a second TN, or (c) the first network node includes the first NTN and the second network node includes the second NTN that is different from the first NTN. For example, the victim UE 1006 in FIG. 10 may be configured to transmit, to the aggressor network node 1004, a CLI measurement report 1027 based on the parameters measured at 1012 associated with the Rx timing of the UL Tx 1024. Moreover, the victim network node 1008 may include a TN, such as the first TN network node 406 in FIG. 4 and the aggressor network node 1004 may include an NTN, such as the second NTN network node 404 in FIG. 4. Or the victim network node 1008 may include an NTN, such as the first NTN network node 402 in FIG. 4, and the aggressor network node 1004 may include a TN, such as the second TN network node 408 in FIG. 4. Or the victim network node 1008 may include a first NTN, such as the first NTN network node 402 in FIG. 4, and the aggressor network node 1004 may include a second NTN, such as the second NTN network node 404 in FIG. 4. Moreover, 1210 may be performed by component 198 in FIG. 17.

At 1212, a first UE may measure the one or more CLI measurement resources during the Rx timing of the one or more CLI measurement resources. For example, the victim UE 1006 in FIG. 10 may measure the Rx timing at 1012 during the Rx timing of the UL Tx 1024. Moreover, 1212 may be performed by component 198 in FIG. 17.

Figure 13:
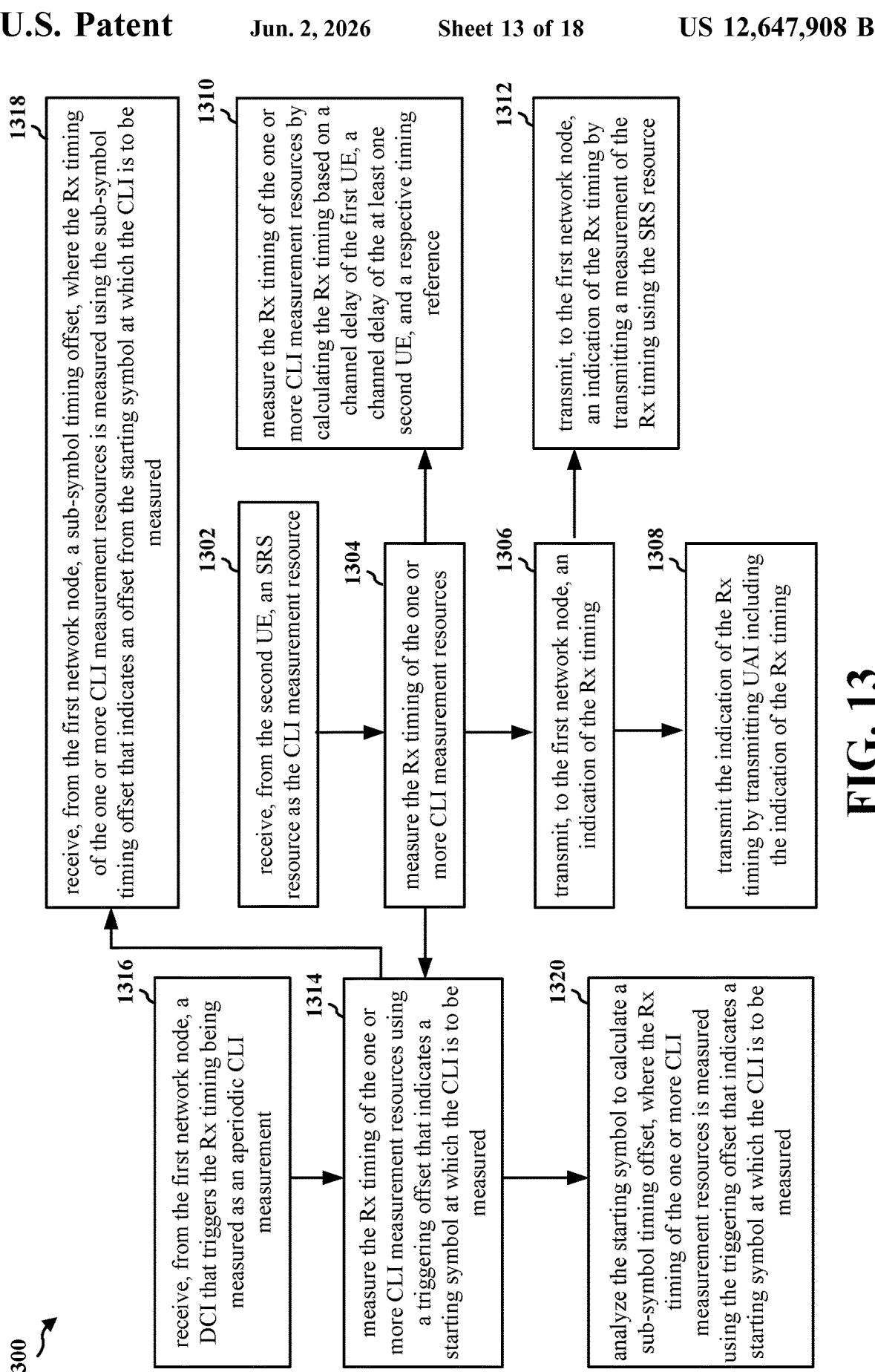
FIG. 13 is a flowchart of another method of wireless communication.

FIG. 13 is a flowchart 1300 of a method of wireless communication. The method may be performed by a UE (e.g., the UE 104, UE 350, UE 412, UE 414, UE 808, UE 906, or UE 1006; the apparatus 1704). At 1302, a first UE may receive, from the second UE, an SRS resource as the CLI measurement resource. For example, the victim UE 906 in FIG. 9 may be configured to receive, from the aggressor UE 902, the UL Tx 924 as an SRS resource. The victim UE 906 may treat the UL Tx 924 as the CLI measurement resource, and may transmit a measurement of the Rx timing of the SRS resource in the CLI measurement report 926. Moreover, 1302 may be performed by component 198 in FIG. 17.

At 1304, a first UE may measure the Rx timing of the one or more CLI measurement resources. For example, 1304 may be performed by the victim UE 906 in FIG. 9, which may measure the Rx timing at 912 of the UL Tx 924. Moreover, 1304 may be performed by component 198 in FIG. 17.

At 1306, a first UE may transmit, to the first network node, an indication of the Rx timing. For example, 1306 may be performed by the victim UE 906 in FIG. 9, which may transmit, to the victim network node 908, CLI measurement report 926 of the Rx timing for the UL Tx 924. Moreover, 1306 may be performed by component 198 in FIG. 17.

At 1308, a first UE may transmit the indication of the Rx timing by transmitting UAI including the indication of the Rx timing. For example, 1308 may be performed by the victim UE 906 in FIG. 9, which may transmit the CLI measurement report 926 by transmitting UAI including the results of the measurement of Rx timing at 912. Moreover, 1308 may be performed by component 198 in FIG. 17.

At 1310, a first UE may measure the Rx timing of the one or more CLI measurement resources by calculating the Rx timing based on a channel delay of the first UE, a channel delay of the at least one second UE, and a respective timing reference. For example, 1310 may be performed by the victim UE 906 in FIG. 9, which may measure the Rx timing at 912 of the UL Tx 924 by calculating the Rx timing based on a channel delay of the victim UE 906, a channel delay of the aggressor UE 902, and a respective timing reference from the CLI resource configuration 922. Moreover, 1310 may be performed by component 198 in FIG. 17.

At 1312, a first UE may transmit, to the first network node, an indication of the Rx timing by transmitting a measurement of the Rx timing using the SRS resource. For example, 1312 may be performed by the victim UE 906 in FIG. 9, which may transmit, to the victim network node 908, a CLI measurement report 926 using the SRS resource provided by the CLI resource configuration 922. Moreover, 1312 may be performed by component 198 in FIG. 17.

At 1314, a first UE may measure the Rx timing of the one or more CLI measurement resources using a triggering offset that indicates a starting symbol at which the CLI is to be measured. For example, 1314 may be performed by the victim UE 906 in FIG. 9, which may measure the Rx timing at 912 of the UL Tx 924 using a triggering offset indicated in the CLI resource configuration 922 that indicates a starting symbol at which the CLI is to be measured, such as the offset of two symbols for the UL Tx/CLI 632 in FIG. 6. Moreover, 1314 may be performed by component 198 in FIG. 17.

At 1316, a first UE may receive, from the first network node, a DCI that triggers the Rx timing being measured as an aperiodic CLI measurement. For example, 1316 may be performed by the victim UE 906 in FIG. 9, which may receive, from the victim network node 908, a DCI as a part of the CLI resource configuration 922 that triggers the UL Tx 924 being measured as an aperiodic CLI measurement. Moreover, 1316 may be performed by component 198 in FIG. 17.

At 1318, a first UE may receive, from the first network node, a sub-symbol timing offset. The Rx timing of the one or more CLI measurement resources is measured using the sub-symbol timing offset that indicates an offset from the starting symbol at which the CLI is to be measured. For example, 1318 may be performed by the victim UE 906 in FIG. 9, which may receive, from the victim network node 908, a sub-symbol timing offset as a part of the CLI resource configuration 922. The sub-symbol timing offset may indicate an offset from the starting symbol at which the CLI is to be measured, for example the UL Tx/CLI 732 in FIG. 7 may have a sub-symbol timing offset of 8 microseconds into symbol 2 of the symbols 710. Moreover, 1318 may be performed by component 198 in FIG. 17.

At 1320, a first UE may analyze the starting symbol to calculate a sub-symbol timing offset. The Rx timing of the one or more CLI measurement resources may be measured using the triggering offset that indicates a starting symbol at which the CLI is to be measured. For example, 1320 may be performed by the victim UE 906 in FIG. 9, which may analyze the starting symbol to calculate a sub-symbol timing offset at 912. The victim UE 906 may measure the symbol that is indicated by the triggering offset that indicates a starting symbol at which the CLI is to be measured, for example a triggering offset of two symbols for the UL Tx/CLI 732 in FIG. 7. Moreover, 1320 may be performed by component 198 in FIG. 17.

Figure 14:
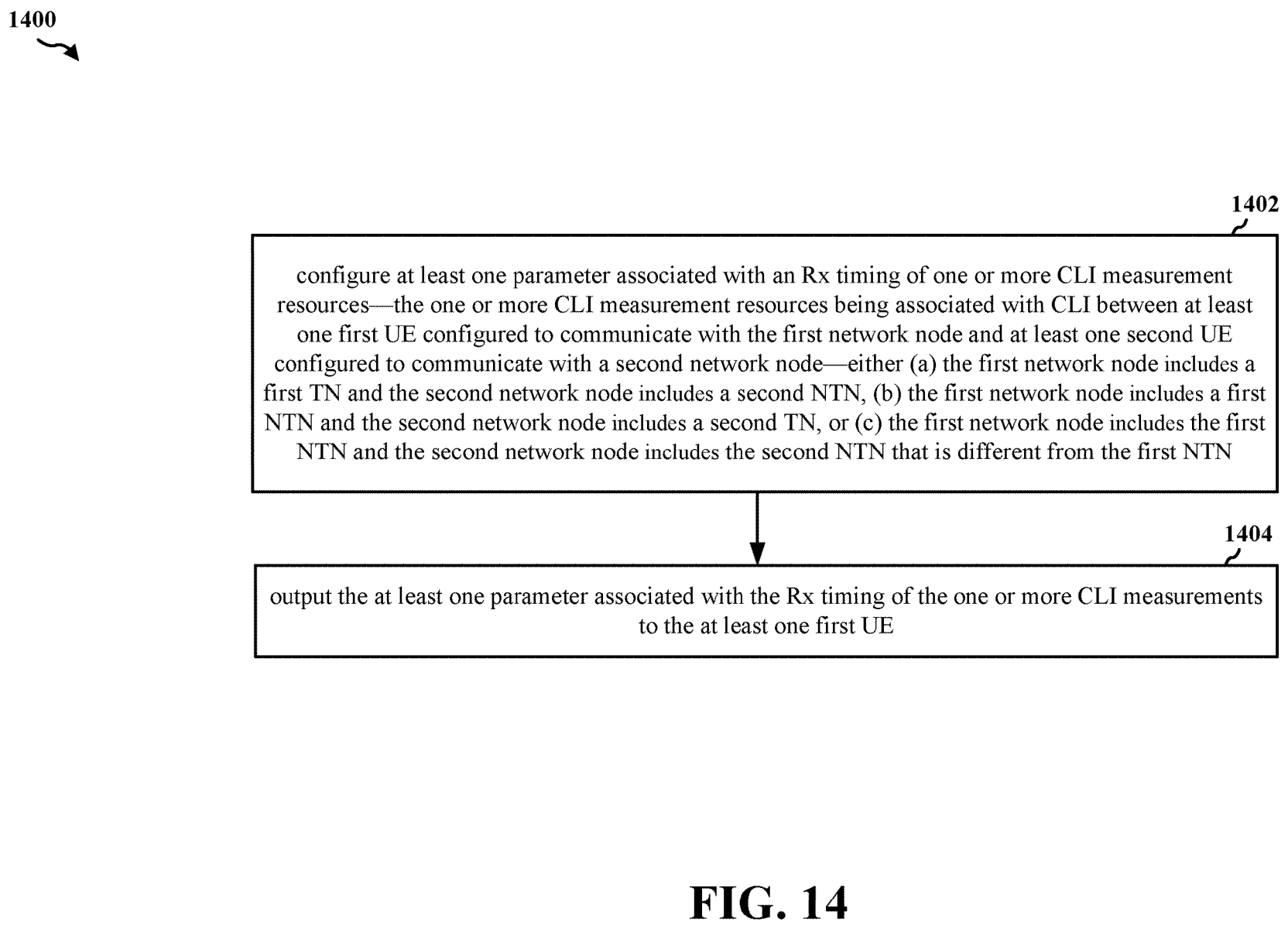

FIG. 14 is a flowchart 1400 of a method of wireless communication. The method may be performed by a base station (e.g., the base station 102, 310; the network node 402, 404, 406, 408, 506, 806, 908, 1008; the network entity 1702). At 1402, a first network node may configure at least one parameter associated with an Rx timing of one or more CLI measurement resources. The one or more CLI measurement resources may be associated with CLI between at least one first UE configured to communicate with the first network node and at least one second UE configured to communicate with a second network node. Either (a) the first network node includes a first TN and the second network node includes a second NTN, (b) the first network node includes a first NTN and the second network node includes a second TN, or (c) the first network node includes the first NTN and the second network node includes the second NTN that is different from the first NTN. For example, 1402 may be performed by the victim network node 806 in FIG. 8, which may configure at least one timing parameter at 816 associated with an Rx timing of the UL Tx 828. The UL Tx 828 may be associated with CLI between the victim UE 808 configured to communicate with the victim network node 806 and the aggressor UE 802 configured to communicate with the aggressor network node 804. Moreover, the victim network node 806 may include a TN, such as the first TN network node 406 in FIG. 4 and the aggressor network node 804 may include an NTN, such as the second NTN network node 404 in FIG. 4. Or the victim network node 806 may include an NTN, such as the first NTN network node 402 in FIG. 4, and the aggressor network node 804 may include a TN, such as the second TN network node 408 in FIG. 4. Or the victim network node 806 may include a first NTN, such as the first NTN network node 402 in FIG. 4, and the aggressor network node 804 may include a second NTN, such as the second NTN network node 404 in FIG. 4. Moreover, 1402 may be performed by component 199 in FIG. 18.

At 1404, a first network node may output the at least one parameter associated with the Rx timing of the one or more CLI measurements to the at least one first UE. For example, 1404 may be performed by the victim network node 806 in FIG. 8, which may be configured to output the timing parameters 827 associated with the Rx timing of the UL Tx 828 to the victim UE 808. Moreover, 1404 may be performed by component 199 in FIG. 18.

FIG. 15 is a flowchart 1500 of a method of wireless communication. The method may be performed by a base station (e.g., the base station 102, 310; the network node 402, 404, 406, 408, 506, 806, 908, 1008; the network entity 1702). At 1502, a first network node may obtain a UE location from the at least one first UE. The at least one parameter associated with the Rx timing is configured based on the UE location. For example, 1502 may be performed by the victim network node 806 in FIG. 8, which may be configured to provide the UE location 823 from the victim UE 808. The timing parameters 826 and 827 may be configured at 816 based on the UE location 823. Moreover, 1502 may be performed by component 199 in FIG. 18.

At 1504, a first network node may configure at least one parameter associated with an Rx timing of one or more CLI measurement resources. The one or more CLI measurement resources may be associated with CLI between at least one first UE configured to communicate with the first network node and at least one second UE configured to communicate with a second network node. For example, 1504 may be performed by the victim network node 806 in FIG. 8, which may configure at least one timing parameter at 816 associated with an Rx timing of the UL Tx 828. The UL Tx 828 may be associated with CLI between the victim UE 808 configured to communicate with the victim network node 806 and the aggressor UE 802 configured to communicate with the aggressor network node 804. Moreover, 1504 may be performed by component 199 in FIG. 18.

At 1506, a first network node may output the at least one parameter associated with the Rx timing of the one or more CLI measurements to the at least one first UE. For example, 1506 may be performed by the victim network node 806 in FIG. 8, which may be configured to output the timing parameters 827 to the victim UE 808 associated with the Rx timing of the UL Tx 828. Moreover, 1506 may be performed by component 199 in FIG. 18.

At 1508, a first network node may refrain from transmitting one or more serving DL channels or resources to the at least one first UE during the Rx timing. The one or more serving DL channels or resources may overlap with at least one symbol of the one or more CLI measurement resources. For example, 1508 may be performed by the victim network node 806 in FIG. 8, which may be configured to refrain from scheduling serving DL at 819 that overlaps with the Rx timing of the UL Tx 828. Moreover, 1508 may be performed by component 199 in FIG. 18.

At 1510, a first network node may obtain an indication of the Rx timing from the at least one first UE. The at least one parameter associated with the Rx timing may be configured based on the indication of the Rx timing. For example, 1510 may be performed by the victim network node 806 in FIG. 8, which may be configured to obtain a UE location 823 from the victim UE 808, which may be used to determine the timing delay between the aggressor UE 802 and the aggressor network node 804 by estimating the location of the aggressor UE using the UE location 823. The victim network node 806 may configure timing parameters at 816 using the UE location 823. Moreover, 1510 may be performed by component 199 in FIG. 18.

At 1512, a first network node may output an SRS resource to the at least one first UE, where the indication of the Rx timing is obtained from the at least one first UE via the SRS resource. For example, 1512 may be performed by the victim network node 908 in FIG. 9, which may be configured to output an SRS resource as a part of the CLI resource configuration 922 output to the victim UE 906. Moreover, 1512 may be performed by component 199 in FIG. 18.

At 1514, a first network node may obtain the indication of the Rx timing from the at least one first UE by obtaining UAI including the indication of the Rx timing. For example, 1514 may be performed by the victim network node 908 in FIG. 9, which may be configured to obtain the CLI measurement report 926 from the victim UE 906 by obtaining UAI including the CLI measurement report 926. Moreover, 1514 may be performed by component 199 in FIG. 18.

FIG. 16 is a flowchart 1600 of a method of wireless communication. The method may be performed by a base station (e.g., the base station 102, 310; the network node 402, 404, 406, 408, 506, 806, 908, 1008; the network entity 1702). At 1602, a first network node may configure at least one parameter associated with an Rx timing of one or more CLI measurement resources. The one or more CLI measurement resources may be associated with CLI between at least one first UE configured to communicate with the first network node and at least one second UE configured to communicate with a second network node. For example, 1602 may be performed by the victim network node 806 in FIG. 8, which may configure at least one timing parameter at 816 associated with an Rx timing of the UL Tx 828. The UL Tx 828 may be associated with CLI between the victim UE 808 configured to communicate with the victim network node 806 and the aggressor UE 802 configured to communicate with the aggressor network node 804. Moreover, 1602 may be performed by component 199 in FIG. 18.

At 1604, a first network node may output the at least one parameter associated with the Rx timing of the one or more CLI measurements to the at least one first UE. For example, 1604 may be performed by the victim network node 806 in FIG. 8, which may be configured to output the timing parameters 827 to the victim UE 808 associated with the Rx timing of the UL Tx 828. Moreover, 1604 may be performed by component 199 in FIG. 18.

At 1606, a first network node may output an indication of an aperiodic CLI measurement of at least one of the one or more CLI measurement resources to the at least one first UE. For example, 1606 may be performed by a victim network node 908, which may be configured to output an indication of an aperiodic CLI measurement as a part of CLI resource configuration 922 of the UL Tx 924 to the victim UE 906. Moreover, 1606 may be performed by component 199 in FIG. 18.

At 1608, a first network node may output the indication of the aperiodic CLI measurement to the at least one first UE includes outputting a DCI including the indication of the aperiodic CLI measurement to the at least one first UE. For example, 1608 may be performed by a victim network node 908, which may be configured to output a DCI including the indication of the aperiodic CLI measurement as a part of the CLI resource configuration 922 of the UL Tx 924 to the victim UE 906. Moreover, 1608 may be performed by component 199 in FIG. 18.

At 1610, a first network node may output a triggering offset to the at least one first UE. The triggering offset may indicate a starting symbol at which the at least one of the one or more CLI measurement resources is to be measured. For example, 1610 may be performed by a victim network node 908, which may be configured to output a triggering offset to the victim UE 906 as a part of the CLI resource configuration 922. The triggering offset may indicate a starting symbol at which the UL Tx 924 is to be measured at 912. For example, an offset of two symbols for the UL Tx/CLI 632 in FIG. 6. Moreover, 1610 may be performed by component 199 in FIG. 18.

At 1612, a first network node may output a sub-symbol timing offset to the at least one first UE. The sub-symbol timing offset may indicate an offset from the starting symbol at which the at least one of the one or more CLI measurement resources is to be measured. For example, 1612 may be performed by a victim network node 908, which may be configured to output a sub-symbol timing offset as a part of the CLI resource configuration 922 to the victim UE 906. The sub-symbol timing offset may indicate an offset from the starting symbol at which the UL Tx 924 is to be measured at 912. For example, a sub-symbol timing offset of 8 microseconds may be used to indicate a sub-symbol offset from the starting symbol 2 for the UL Tx/CLI 732 in FIG. 7. Moreover, 1612 may be performed by component 199 in FIG. 18.

Figure 17:
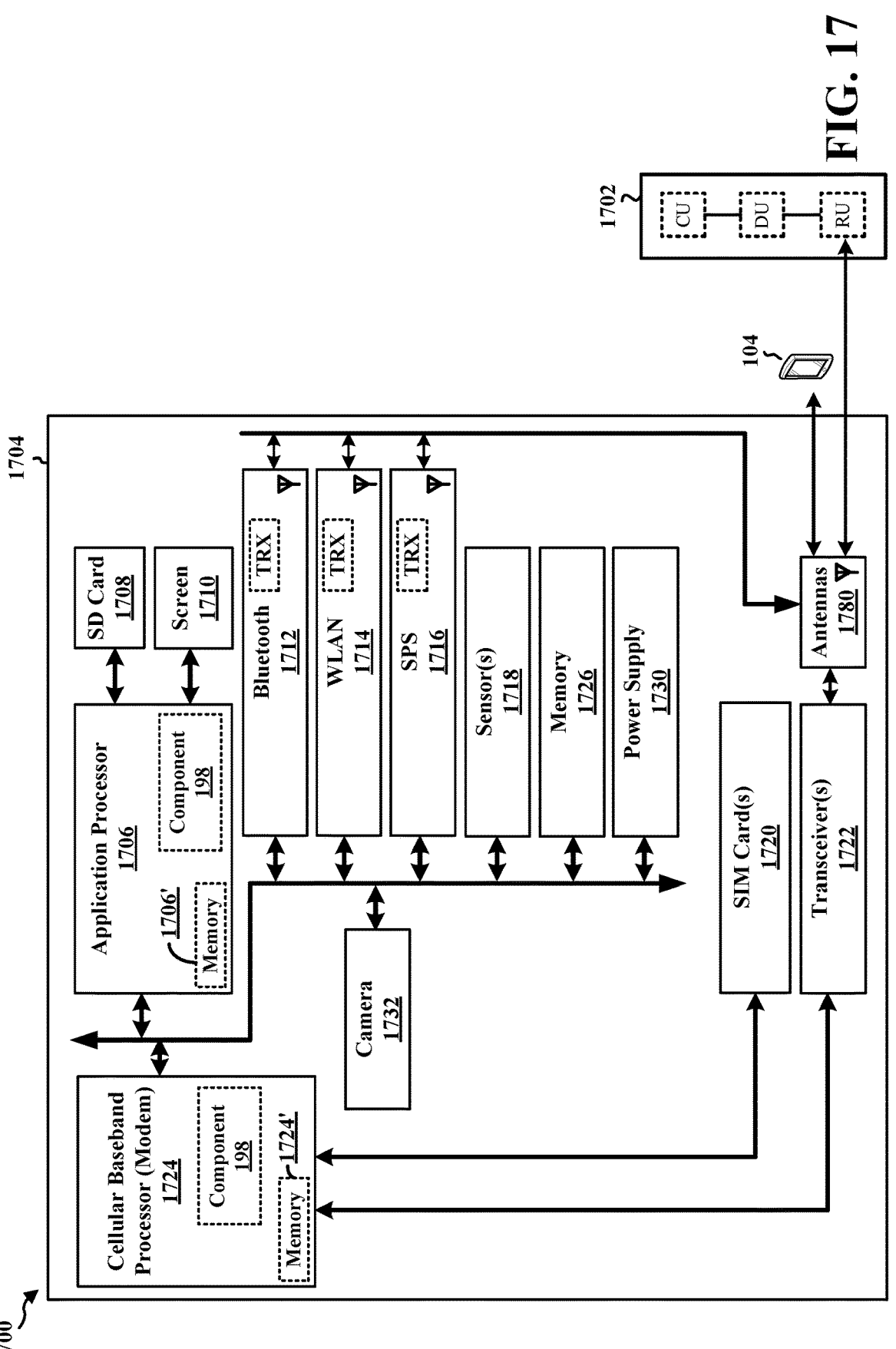
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (Rx)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the Tx processor 368, the Rx processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see UE 350 of FIG. 3) and include the additional modules of the apparatus 1704.

As discussed supra, the component 198 is configured to obtain at least one parameter associated with an Rx timing of one or more CLI measurement resources and refrain from receiving one or more serving DL channels or resources from a network node during the Rx timing based on the at least one parameter. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for obtaining at least one parameter associated with a Rx timing of one or more CLI measurement resources, means for refraining from receiving one or more serving DL channels or resources from a first network node during the Rx timing based on the at least one parameter, means for transmitting a UE location associated with the Rx timing, means for measuring the Rx timing of the one or more CLI measurement resources, means for transmitting an indication of the Rx timing, means for receiving an SRS resource, means for transmitting the indication of the Rx timing by transmitting a measurement of the Rx timing using the SRS resource, means for measuring the Rx timing of the one or more CLI measurement resources by calculating the Rx timing based on a channel delay of the first UE, a channel delay of the at least one second UE, and a respective timing reference, means for measuring the Rx timing of the one or more CLI measurement resources by using a triggering offset that indicates a starting symbol at which the CLI is to be measured, means for receiving a DCI that triggers the Rx timing being measured as an aperiodic CLI measurement, means for receiving a sub-symbol timing offset, means for measuring the Rx timing of the one or more CLI measurement resources by using the sub-symbol timing offset that indicates an offset from the starting symbol at which the CLI is to be measured, means for analyzing the starting symbol to calculate a sub-symbol timing offset, means for measuring the Rx timing of the one or more CLI measurement resources using the triggering offset that indicates a starting symbol at which the CLI is to be measured, means for transmitting the indication of the Rx timing by transmitting UAI including the indication of the Rx timing, means for obtaining the at least one parameter associated with the Rx timing by receiving the at least one parameter associated with the Rx timing from the first network node, means for transmitting an inter-UE measurement result based on the at least one parameter associated with the Rx timing of the one or more CLI measurement resources, and means for measuring the one or more CLI measurement resources during the Rx timing of the one or more CLI measurement resources. The means may be the component 198 of the apparatus 1704 configured to perform the functions recited by the means. As described supra, the apparatus 1704 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 18:
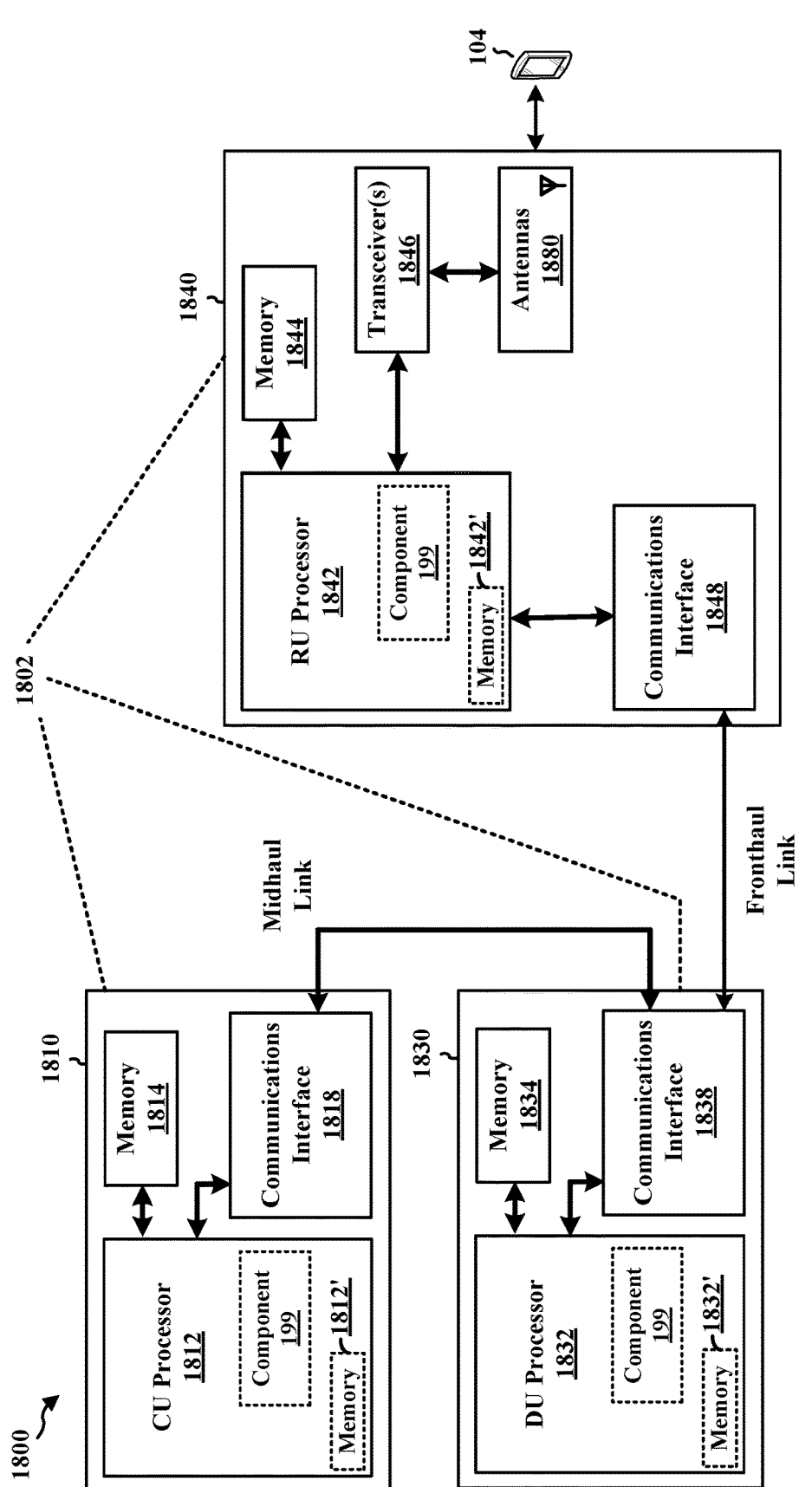
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the component 199, the network entity 1802 may include the CU 1810; both the CU 1810 and the DU 1830; each of the CU 1810, the DU 1830, and the RU 1840; the DU 1830; both the DU 1830 and the RU 1840; or the RU 1840. The CU 1810 may include a CU processor 1812. The CU processor 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include a DU processor 1832. The DU processor 1832 may include on-chip memory 1832'. In some aspects, the DU 1830 may further include additional memory modules 1834 and a communications interface 1838. The DU 1830 communicates with the RU 1840 through a fronthaul link. The RU 1840 may include an RU processor 1842. The RU processor 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure at least one parameter associated with an Rx timing of one or more CLI measurement resources and output the at least one parameter associated with the Rx timing of the one or more CLI measurement resources to a UE. The component 199 may be within one or more processors of one or more of the CU 1810, DU 1830, and the RU 1840. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1802 may include a variety of components configured for various functions. In one configuration, the network entity 1802 includes means for configuring at least one parameter associated with a Rx timing of one or more CLI measurement resources, means for outputting the at least one parameter associated with the Rx timing of the one or more CLI measurement resources to the at least one first UE, means for obtaining a UE location from the at least one first UE, means for obtaining an indication of the Rx timing from the at least one first UE, means for outputting a SRS resource to the at least one first UE, means for obtaining the indication of the Rx timing from the at least one first UE by obtaining UAI including the indication of the Rx timing, means for outputting an indication of an aperiodic CLI measurement of at least one of the one or more CLI measurement resources to the at least one first UE, means for outputting the indication of the aperiodic CLI measurement to the at least one first UE by outputting a DCI including the indication of the aperiodic CLI measurement to the at least one first UE, means for outputting a triggering offset to the at least one first UE, means for outputting a sub-symbol timing offset to the at least one first UE, and means for refraining from transmitting one or more serving DL channels or resources to the at least one first UE during the Rx timing, where the one or more serving DL channels or resources overlap with at least one symbol of the one or more CLI measurement resources. The means may be the component 199 of the network entity 1802 configured to perform the functions recited by the means. As described supra, the network entity 1802 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

A "serving DL channel" may include a frequency/wavelength of the electromagnetic spectrum used by a network node of a UE's serving cell for transmission from a transceiver of the network node to a UE, such as the DL channels of diagram 230 in FIG. 2B.

A "resource" may include any portion of the electromagnetic spectrum defined within a time domain, such as the resource blocks of FIG. 2A-2D.

Cross-link interference, or "CLI," may include interference that occurs when one wireless device is transmitting using a resource while another is receiving using the same resource, or serving DL channel. Such an overlap of resources may degrade the ability or likelihood of a device, such as a UE, to successfully decode an Rx signal using the overlapping resource.

A "CLI measurement resource" may include a Tx signal that is capable of causing CLI to a UE's serving DL channel. A CLI measurement resource may include a PUCCH, or a PUSCH.

When two UEs share a cell such that a Tx signal from one UE causes CLI for an Rx signal to another UE, the UE transmitting the Tx signal may be referred to as the "aggressor UE" and the UE receiving the Rx signal may be referred to as the "victim UE."

UE assistance information, or "UAI," may include any information element (IE) provided by a UE that may be used to determine a timing delay of the UE, such as a delay budget report, a connected mode DRX cycle length, overheating assistance information, or a timing offset between a Tx signal and an Rx signal using overlapping resources.

"Rx timing" may include a start and end time of a wireless signal received by a UE.

The following aspects are illustrative only and may be combined with other aspects or teachings described herein, without limitation.

Aspect 1 is a method of wireless communication at a first UE, including obtaining at least one parameter associated with an Rx timing of one or more CLI measurement resources. The one or more CLI measurement resources may be associated with CLI between the first UE and at least one second UE. The method may further include refraining from receiving one or more serving DL channels or resources from a first network node during the Rx timing based on the at least one parameter. The one or more serving DL channels or resources may overlap with at least one symbol of the one or more CLI measurement resources.

Aspect 2 is the method of aspect 1, further including transmitting, to the first network node, a UE location associated with the Rx timing.

Aspect 3 is the method of any of aspects 1 and 2, further including measuring the Rx timing of the one or more CLI measurement resources. The method may further include transmitting, to the first network node, an indication of the Rx timing.

Aspect 4 is the method of aspect 3, further including receiving, from the second UE, an SRS resource as the CLI measurement resource. Transmitting the indication of the Rx timing may include transmitting a measurement of the Rx timing of the SRS resource.

Aspect 5 is the method of any of aspects 3 to 4, where measuring the Rx timing of the one or more CLI measurement resources may include calculating the Rx timing based on a channel delay of the first UE, a channel delay of the at least one second UE, and a respective timing reference.

Aspect 6 is the method of any of aspects 3 to 5, where the Rx timing of the one or more CLI measurement resources is measured using a triggering offset that indicates a starting symbol at which the CLI is to be measured.

Aspect 7 is the method of aspect 6, further including receiving, from the first network node, a DCI that triggers the Rx timing being measured as an aperiodic CLI measurement.

Aspect 8 is the method of any of aspects 6 to 7, further including receiving, from the first network node, a sub-symbol timing offset. The Rx timing of the one or more CLI measurement resources may be measured using the sub-symbol timing offset that indicates an offset from the starting symbol at which the CLI is to be measured.

Aspect 9 is the method of any of aspects 6 to 7, further including analyzing the starting symbol to calculate a sub-symbol timing offset. The Rx timing of the one or more CLI measurement resources may be measured using the triggering offset that indicates a starting symbol at which the CLI is to be measured.

Aspect 10 is the method of any of aspects 3 to 9, where transmitting the indication of the Rx timing may include transmitting UAI having the indication of the Rx timing.

Aspect 11 is the method of any of aspects 1 to 10, where obtaining the at least one parameter associated with the Rx timing may include receiving the at least one parameter associated with the Rx timing from the first network node.

Aspect 12 is the method of any of aspects 1 to 11, where the at least one parameter associated with the Rx timing of the one or more CLI measurement resources may include at least one of an initial timing offset, a slew rate for linear modeling of a variation, or a set of variables of a formula configured to model higher order variation of the initial timing offset.

Aspect 13 is the method of any of aspects 1 to 12, further including transmitting, to a second network node that communicates with the at least one second UE, an inter-UE measurement result based on the at least one parameter associated with the Rx timing of the one or more CLI measurement resources.

Aspect 14 is the method of aspect 13, where (a) the first network node includes a first TN and the second network node includes a second NTN, (b) the first network node includes a first NTN and the second network node includes a second TN, or (c) the first network node includes the first NTN and the second network node includes the second NTN that is different from the first NTN.

Aspect 15 is the method of any of aspects 1 to 14, where the one or more serving DL channels or resources include at least one of a PDCCH, a PDSCH, or a CSI-RS.

Aspect 16 is the method of any of aspects 1 to 15, further including measuring the one or more CLI measurement resources during the Rx timing of the one or more CLI measurement resources.

Aspect 17 is a method of wireless communication at a first network node, including configuring at least one parameter associated with an Rx timing of one or more CLI measurement resources. The one or more CLI measurement resources may be associated with CLI between at least one first UE configured to communicate with the first network node and at least one second UE configured to communicate with a second network node. Either (a) the first network node includes a first TN and the second network node includes a second NTN, (b) the first network node includes a first NTN and the second network node includes a second TN, or (c) the first network node includes the first NTN and the second network node includes the second NTN that is different from the first NTN. The method may further include outputting the at least one parameter associated with the Rx timing of the one or more CLI measurement resources to the at least one first UE.

Aspect 18 is the method of aspect 17, further including obtaining a UE location from the at least one first UE. The at least one parameter associated with the Rx timing may be configured based on the UE location.

Aspect 19 is the method of any of aspects 16 to 17, further including obtaining an indication of the Rx timing from the at least one first UE. The at least one parameter associated with the Rx timing may be configured based on the indication of the Rx timing.

Aspect 20 is the method of aspect 19, further including outputting an SRS resource to the at least one first UE. The indication of the Rx timing may be obtained from the at least one first UE via the SRS resource.

Aspect 21 is the method of any of aspects 19 to 20, where obtaining the indication of the Rx timing from the at least one first UE may include obtaining UAI having the indication of the Rx timing.

Aspect 22 is the method of any of aspects 19 to 21, where the indication of the Rx timing may include at least one of an initial timing offset, a slew rate for linear modeling of a variation, or a set of variables of a formula configured to model higher order variation of the initial timing offset.

Aspect 23 is the method of any of aspects 17 to 22, further including outputting an indication of an aperiodic CLI measurement of at least one of the one or more CLI measurement resources to the at least one first UE.

Aspect 24 is the method of aspect 23, where outputting the indication of the aperiodic CLI measurement to the at least one first UE may include outputting a DCI having the indication of the aperiodic CLI measurement to the at least one first UE.

Aspect 25 is the method of any of aspects 23 to 24, further including outputting a triggering offset to the at least one first UE. The triggering offset may indicate a starting symbol at which the at least one of the one or more CLI measurement resources is to be measured.

Aspect 26 is the method of aspect 25, further including outputting a sub-symbol timing offset to the at least one first UE. The sub-symbol timing offset may indicate an offset from the starting symbol at which the at least one of the one or more CLI measurement resources is to be measured.

Aspect 27 is a method of wireless communication at a first network node, including configuring at least one parameter associated with an Rx timing of one or more CLI measurement resources. The one or more CLI measurement resources may be associated with CLI between at least one first UE configured to communicate with the first network node and at least one second UE configured to communicate with a second network node. Either (a) the first network node includes a first TN and the second network node includes a second NTN, (b) the first network node includes a first NTN and the second network node includes a second TN, or (c) the first network node includes the first NTN and the second network node includes the second NTN that is different from the first NTN. The method may further include refraining from transmitting one or more serving DL channels or resources to the at least one first UE during the Rx timing. The one or more serving DL channels or resources may overlap with at least one symbol of the one or more CLI measurement resources.

Aspect 28 is the method of aspect 27, where the one or more serving DL channels or resources may include at least one of a PDCCH, a PDSCH, or a CSI-RS.

Aspect 29 is an apparatus for wireless communication for implementing a method as in any of aspects 1-28.

Aspect 30 is an apparatus for wireless communication including means for implementing a method as in any of aspects 1-28.

Aspect 31 may be combined with any of aspects 29-30 and further includes at least one of a transceiver or an antenna coupled to at least one processor of the apparatus.

Aspect 32 is a non-transitory computer-readable medium storing computer executable code, the code when executed by at least one processor causes the at least one processor to implement a method as in any of aspects 1-28.

What is claimed is:

1. An apparatus for wireless communication at a first network node, comprising:

at least one memory; and at least one processor coupled to the at least one memory and, based at least in part on information stored in the at least one memory, the at least one processor is configured to:

receive, from at least one first user equipment (UE), an indication of a Rx timing of one or more cross-link interference (CLI) measurement resources and a timing of one or more serving downlink (DL) channels or resources;

determine at least one timing offset between the Rx timing of the one or more CLI measurement resources and the one or more serving DL channels or resources based on the received indication;

configure at least one timing parameter based on the determined at least one timing offset, wherein the one or more CLI measurement resources being associated with CLI between the at least one first UE configured to communicate with the first network node and at least one second UE configured to communicate with a second network node, and wherein either (a) the first network node comprises a first terrestrial network (TN) and the second network node comprises a second non-terrestrial network (NTN), (b) the first network node comprises a first NTN and the second network node comprises a second TN, or (c) the first network node comprises the first NTN and the second network node comprises the second NTN that is different from the first NTN; and transmit the configured at least one timing parameter to the at least one first UE.

2. The apparatus of claim 1, wherein the at least one processor is further configured to:

transmit a second indication of a sounding reference signal (SRS) resource to the at least one first UE, wherein, to receive the indication of the Rx timing from the at least one first UE, the at least one processor is configured to:

receive the SRS resource comprising the indication of the Rx timing.

3. The apparatus of claim 1, wherein, to receive the indication of the Rx timing from the at least one first UE, the at least one processor is further configured to:

receive UE assistance information (UAI) comprising the indication of the Rx timing.

4. The apparatus of claim 1, wherein the indication of the Rx timing comprises at least one of an initial timing offset, a slew rate for linear modeling of a variation, or a set of variables of a formula configured to model higher order variation of the initial timing offset.

5. The apparatus of claim 1, wherein the at least one processor is further configured to:

transmit second indication of an aperiodic CLI measurement of at least one of the one or more CLI measurement resources to the at least one first UE before receiving the indication of the Rx timing from the at least one first UE.

6. The apparatus of claim 5, wherein the at least one processor is further configured to:

transmit downlink control information (DCI) comprising the indication of the aperiodic CLI measurement to the at least one first UE.

7. The apparatus of claim 5, wherein the at least one processor is further configured to:

transmit a triggering offset to the at least one first UE, wherein the triggering offset indicates a starting symbol at which the at least one of the one or more CLI measurement resources is to be measured by the at least one first UE.

8. The apparatus of claim 7, wherein the at least one processor is further configured to:

transmit a sub-symbol timing offset to the at least one first UE, wherein the sub-symbol timing offset indicates an offset from the starting symbol at which the at least one of the one or more CLI measurement resources is to be measured.

9. The apparatus of claim 1, wherein the at least one processor is further configured to:

refrain from transmitting one or more serving DL channels or resources to the at least one first UE during the Rx timing, wherein the one or more serving DL channels or resources overlap with at least one symbol of the one or more CLI measurement resources.

10. The apparatus of claim 9, wherein the one or more serving DL channels or resources comprise at least one of a physical downlink control channel (PDCCH), a physical downlink shared channel (PDSCH), or a channel state information reference signal (CSI-RS).

11. A method of wireless communication at a first network node, comprising:

receiving, from at least one first user equipment (UE), an indication of a Rx timing of one or more cross-link interference (CLI) measurement resources and a timing of one or more serving downlink (DL) channels or resources;

determining at least one timing offset between the Rx timing of the one or more CLI measurement resources and the one or more serving DL channels or resources based on the received indication;

configuring at least one timing parameter based on the determined at least one timing offset, wherein the one or more CLI measurement resources being associated with CLI between the at least one first UE configured to communicate with the first network node and at least one second UE configured to communicate with a second network node, and wherein either (a) the first network node comprises a first terrestrial network (TN) and the second network node comprises a second non-terrestrial network (NTN), (b) the first network node comprises a first NTN and the second network node comprises a second TN, or (c) the first network node comprises the first NTN and the second network node comprises the second NTN that is different from the first NTN; and transmitting the configured at least one timing parameter to the at least one first UE.

12. The method of claim 11, further comprising:

transmitting a second indication of a sounding reference signal (SRS) resource to the at least one first UE, wherein receiving the indication of the Rx timing from the at least one first UE comprises:

receiving the SRS resource comprising the indication of the Rx timing.

13. The method of claim 11, wherein receiving the indication of the Rx timing from the at least one first UE comprises:

receiving UE assistance information (UAI) comprising the indication of the Rx timing.

14. The method of claim 11, wherein the indication of the Rx timing comprises at least one of:

an initial timing offset;

a slew rate for linear modeling of a variation; or a set of variables of a formula configured to model higher order variation of the initial timing offset.

15. The method of claim 11, further comprising:

transmitting second indication of an aperiodic CLI measurement of at least one of the one or more CLI measurement resources to the at least one first UE before receiving the indication of the Rx timing from the at least one first UE.

16. The method of claim 15, further comprising:

transmitting downlink control information (DCI) comprising the indication of the aperiodic CLI measurement to the at least one first UE.

17. The method of claim 15, further comprising:

transmitting a triggering offset to the at least one first UE, wherein the triggering offset indicates a starting symbol at which the at least one of the one or more CLI measurement resources is to be measured by the at least one first UE.

18. The method of claim 17, further comprising:

transmitting a sub-symbol timing offset to the at least one first UE, wherein the sub-symbol timing offset indicates an offset from the starting symbol at which the at least one of the one or more CLI measurement resources is to be measured.

19. The method of claim 11, further comprising:

refraining from transmitting one or more serving DL channels or resources to the at least one first UE during the Rx timing, wherein the one or more serving DL channels or resources overlap with at least one symbol of the one or more CLI measurement resources.

20. The method of claim 19, wherein the one or more serving DL channels or resources comprise at least one of a physical downlink control channel (PDCCH), a physical downlink shared channel (PDSCH), or a channel state information reference signal (CSI-RS).

21. A non-transitory computer-readable medium storing computer executable code at a first network node, the code when executed by at least one processor causes the at least one processor to:

receive, from at least one first user equipment (UE), an indication of a Rx timing of one or more cross-link interference (CLI) measurement resources and a timing of one or more serving downlink (DL) channels or resources;

determine at least one timing offset between the Rx timing of the one or more CLI measurement resources and the one or more serving DL channels or resources based on the received indication;

configure at least one timing parameter based on the determined at least one timing offset, wherein the one or more CLI measurement resources being associated with CLI between the at least one first UE configured to communicate with the first network node and at least one second UE configured to communicate with a second network node, and wherein either (a) the first network node comprises a first terrestrial network (TN) and the second network node comprises a second non-terrestrial network (NTN), (b) the first network node comprises a first NTN and the second network node comprises a second TN, or (c) the first network node comprises the first NTN and the second network node comprises the second NTN that is different from the first NTN; and transmit the configured at least one timing parameter to the at least one first UE.

22. The non-transitory computer-readable medium of claim 21, wherein the code when executed by at least one processor further causes the at least one processor to:

transmit a second indication of a sounding reference signal (SRS) resource to the at least one first UE, wherein, to receive the indication of the Rx timing from the at least one first UE, the code when executed by at least one processor causes the at least one processor to: receive the SRS resource comprising the indication of the Rx timing.

23. The non-transitory computer-readable medium of claim 21, wherein, to receive the indication of the Rx timing from the at least one first UE, the code when executed by at least one processor causes the at least one processor to:

receive UE assistance information (UAI) comprising the indication of the Rx timing.

24. The non-transitory computer-readable medium of claim 21, wherein the indication of the Rx timing comprises at least one of:

an initial timing offset;

a slew rate for linear modeling of a variation; or a set of variables of a formula configured to model higher order variation of the initial timing offset.

25. The non-transitory computer-readable medium of claim 21, wherein the code when executed by at least one processor further causes the at least one processor to:

transmit second indication of an aperiodic CLI measurement of at least one of the one or more CLI measurement resources to the at least one first UE before receiving the indication of the Rx timing from the at least one first UE.

26. The non-transitory computer-readable medium of claim 25, wherein the code when executed by at least one processor further causes the at least one processor to:

transmit downlink control information (DCI) comprising the indication of the aperiodic CLI measurement to the at least one first UE.

27. The non-transitory computer-readable medium of claim 25, wherein the code when executed by at least one processor further causes the at least one processor to:

transmit a triggering offset to the at least one first UE, wherein the triggering offset indicates a starting symbol at which the at least one of the one or more CLI measurement resources is to be measured by the at least one first UE.

28. The non-transitory computer-readable medium of claim 27, wherein the code when executed by at least one processor further causes the at least one processor to:

transmit a sub-symbol timing offset to the at least one first UE, wherein the sub-symbol timing offset indicates an offset from the starting symbol at which the at least one of the one or more CLI measurement resources is to be measured.

29. The non-transitory computer-readable medium of claim 21, wherein the code when executed by at least one processor further causes the at least one processor to:

refrain from transmitting one or more serving DL channels or resources to the at least one first UE during the Rx timing, wherein the one or more serving DL channels or resources overlap with at least one symbol of the one or more CLI measurement resources.

30. The non-transitory computer-readable medium of claim 29, wherein the one or more serving DL channels or resources comprise at least one of a physical downlink control channel (PDCCH), a physical downlink shared channel (PDSCH), or a channel state information reference signal (CSI-RS).

* * * * *